United States Patent [19]
Smith et al.

[11] Patent Number: 5,766,478
[45] Date of Patent: Jun. 16, 1998

[54] WATER-SOLUBLE POLYMERS FOR RECOVERY OF METAL IONS FROM AQUEOUS STREAMS

[75] Inventors: Barbara F. Smith; Thomas W. Robison, both of Los Alamos, N. Mex.

[73] Assignee: The Regents of the University of California, Office of Technology Transfer, Alameda, Calif.

[21] Appl. No.: 453,406

[22] Filed: May 30, 1995

[51] Int. Cl.$^6$ .............................. B01D 11/02; B01D 6/58
[52] U.S. Cl. .................... 210/638; 210/639; 210/651; 423/8; 423/9; 423/21.5
[58] Field of Search .................... 210/638, 735, 210/651, 634, 682, 684, 688, 639, 644, 912; 423/21.5, 9, 21.1, 8, 10

[56] References Cited

U.S. PATENT DOCUMENTS

| | | | |
|---|---|---|---|
| 3,294,494 | 12/1966 | Moore | 423/21.5 |
| 4,461,747 | 7/1984 | Fitoussi et al. | 423/10 |
| 4,574,072 | 3/1986 | Horwitz et al. | 423/9 |
| 4,741,831 | 5/1988 | Grinstead | 210/638 |
| 4,770,784 | 9/1988 | Davis et al. | 210/638 |
| 5,256,383 | 10/1993 | Cordier et al. | 423/9 |
| 5,338,532 | 8/1994 | Tomalia et al. | 424/1.49 |
| 5,346,627 | 9/1994 | Siefert et al. | 210/729 |
| 5,347,071 | 9/1994 | Moriya et al. | 588/256 |
| 5,387,365 | 2/1995 | Moriya et al. | 252/180 |
| 5,395,896 | 3/1995 | Moriya et al. | 525/328.2 |
| 5,409,678 | 4/1995 | Smith et al. | 423/9 |
| 5,510,090 | 4/1996 | Cuillerdier et al. | 423/9 |

FOREIGN PATENT DOCUMENTS

| | | | |
|---|---|---|---|
| 0437851A1 | 12/1990 | European Pat. Off. | B01J 45/00 |
| 1466150 | 12/1973 | United Kingdom | B01D 13/00 |

OTHER PUBLICATIONS

B. Y. Spivakov et al., Liquid-phase Polymer-Based Retention—the Separation of Metals by Ultrafiltration on Polychelatogens, Nature, 1985, vol. 315, pp. 313-315.

V. M. Shkinev et al., Determination of Trace Heavy Metals in Waters by Atomic-Absorption Spectrometry after Preconcentration by Liquid-Phase Polymer-Based Retention, Talanta, 1989, vol. 36, No. 8, pp. 861-863.

B. Chaufer et al., Removal of Metal Ions by Complexation-Ultrafiltration Using Water-Soluble Macromolecules, Nuclear and Chemical Waste Management, 1988, vol. 8, pp. 178-187.

M. Rumeau et al., Separation by Coupling Ultrafiltration and Complexation of Metallic Species with Industrial Water Soluble Polymers, Journal of Membrane Science, 1992, vol. 73, pp. 313-322.

L. P. Buckley et al., Selective Removal of Dissolved Toxic Metals from Groundwater by Ultrafiltration in Combination with Chemical Treatment, Paper at HAZTECH International 89 Conference, Cincinnati, Ohio, Sep. 12-14, 1989.

V. T. Lee et al., Selective Removal of Dissolved Radioactivity from Aqueous Wastes by a Chemical Treatment/Ultrafiltration Technique, Paper No. S10b at International Conference on Separation Science and Technology, Hamilton, Canada, Oct. 1-4, 1989.

L. P. Buckley et al., The Removal of Soluble Toxic Metals from Water, paper at Annual Environmental Protection Agency (EPA) research symposium, Cincinnati, Ohio, Apr. 3-5, 1990.

EPA Technology Profile, "Atomic Energy of Canada LTD", Superfund Innovative Technology Evaluation, Nov. 1988, pp. 69-70.

(List continued on next page.)

*Primary Examiner*—Joseph W. Drodge
*Attorney, Agent, or Firm*—Bruce H. Cottrell

[57] ABSTRACT

A process of selectively separating a target metal contained in an aqueous solution by contacting the aqueous solution containing a target metal with an aqueous solution including a water-soluble polymer capable of binding with the target metal for sufficient time whereby a water-soluble polymer-target metal complex is formed, and, separating the solution including the water-soluble polymer-target metal complex from the solution is disclosed.

33 Claims, 1 Drawing Sheet

OTHER PUBLICATIONS

Geckler et al., "Removal of Hazardous Substances from Water using Ultraltration in Conjunction with Soluble Polymers", Environmental Science & Technology, vol. 30, No. 3, pp. 725–734 (1996).

Geckler et al., "Preparation and Application of Water–Soluble Polymer–Metal Complexes", Pure & Applied Chem., vol. 52, pp. 1883–1905 (1980).

Volchek et al., "Polymer binding/ultrafiltration as a method for concentration and separation of metals", J. of Membrane Sci., vol. 79, pp. 253–272 (1993).

H. Strathmann, "Selective Removal of Heavy Metal Ions from Aqueous Solutions by Diafiltration of Macromolecular Complexes", Separation Science & Technology, 15(4), 1980, pp. 1135–1152.

E. Bayer et al., "Soluble Polychelatogenes for Separation of Actinide Ions by Membrane Filtration", Israel Journal of Chemistry, 1985, vol. 26, pp. 40–47.

S. Kobayashi et al., Phosphonomethylated Polyethylenimine Resin for Recovery of Uranium from Seawater, Polymer Bulletin, 1986, vol. 15, pp. 7–12.

K. E. Geckeler et al., Liquid–Phase Polymer–Based Retention, A New Method for Separation and Preconcentration of Elements, Analytica Chimica Acta, 1986, pp. 285–292.

V. A. Kichik et al., Method for Reprocessing Liquid Radioactive Wastes, Combining Selective Complexing and Ultrafiltration, translation from Atomnaya Energiya, vol. 58, No. 4, pp. 272–273 (Apr. 1985) by Plenum Publishing Corporation, 1985, pp. 315–317.

Ye. Ye. Yergozhin et al., 8–Hydroxyquinilone–Based, Soluble, and Chelate Forming Ion Exchangers and Some of Their Physical and Chemical Properties, Polymer Science U.S.S.R. vol. 21, pp. 2225–2233 (1980).

WATER-SOLUBLE POLYMERS FOR RECOVERY OF METAL IONS FROM AQUEOUS STREAMS

FIELD OF THE INVENTION

The present invention relates to water-soluble metal-binding polymers and in the use of such water-soluble metal-binding polymers in a process for selective separation of metal ions from aqueous streams. The metal ions can further be concentrated and removed or recovered. In such a process, the metal ions can be bound to the polymer via electrostatic and/or complexation or chelation processes and then treated by a separation means, such as ultrafiltration, to reduce water content and other unbound molecules and ions. This invention is the result of a contract with the Department of Energy (Contract No. W-7405-ENG-36).

BACKGROUND OF THE INVENTION

Water-soluble polymers are well known for the retention or recovery of certain metal ions from solutions under certain conditions, e.g., certain pH conditions (see, e.g., Pure and Applied Chemistry, Vol. 52, pp. 1883–1905 (1980), Talanta, vol. 36, No. 8, pp. 861–863 (1989), and U.S. Pat. No. 4,741,831). Additionally, higher molecular weight varieties of the water-soluble polymers such as polyethyleneimine have been used as coatings on, e.g. silica gel, for separation and recovery of metal ions. However, the selectivity of the polymer for target metals due to competition from competing or interfering ions within solutions can present unique challenges.

Among the various aqueous streams that may need to be approached in the selective separation of metal ions are brines such as sea water and brine-containing process streams, body fluids such as urine, electroplating waste waters such as rinse baths, textile waste waters, actinide-processing waste waters, catalyst-processing waste waters, electronics-processing waste waters, geothermal waters, oil-well waters, ore leachate process streams, oxoanion recovery from such mining and production activities, mining waste waters from acid drainage of mines, cooling tower streams, general waste water streams from water treatment facilities, contaminated aquifer waters or drinking water streams, and the like. Each of these systems presents a different and unique challenge due to the varying composition of that particular aqueous stream.

It is an object of the present invention to provide a process of selectively separating a target metal or metals from an aqueous solution.

It is still a further objective of the invention to provide a process of selectively separating a target metal from aqueous streams including competing ions, such streams including electroplating-processing waste water streams, textile-processing waste water streams, actinide-processing waste water streams, catalyst-processing waste water streams, electronics-processing waste water streams, ore-processing waste streams, mining waste water streams, general waste water streams and the like, and other aqueous streams such as body fluids, brine solutions, cooling tower waters, drinking water and the like.

SUMMARY OF THE INVENTION

To achieve the foregoing and other objects, and in accordance with the purposes of the present invention, as embodied and broadly described herein, the present invention provides a process of separating selected metal ions from an aqueous solution including contacting an aqueous solution with a reaction solution for a time sufficient to form a water-soluble polymer-metal complex, the reaction solution including an effective amount of a water-soluble polymer having nitrogen-, oxygen- or sulfur-containing groups capable of binding selected metal ions, said water-soluble polymer having a molecular weight of greater than a first preselected level and characterized as essentially free of molecular weights less than a second preselected level, treating the aqueous solution by membrane separation means effective to separate water and low molecular weight materials having a molecular weight of less than said first preselected level from the aqueous solution while retaining a concentrated aqueous solution including materials having a molecular weight of greater than said first preselected level, said materials having a molecular weight of greater than said first preselected level including said water-soluble polymer and said water-soluble polymer-metal complex, contacting the concentrated aqueous solution with a material selected from the group consisting of an acid, a reducing agent, and a complexent under conditions effective to release the selected metal ions from the water-soluble polymer-metal complex and to form regenerated water-soluble polymer, and, removing the released selected metal ions by a secondary membrane separation means effective to separate the released selected metal ions from said concentrated aqueous solution including said regenerated water-soluble polymer.

In another embodiment of the invention, the concentrated aqueous solution including said regenerated water-soluble polymer is recycled as reaction solution for contact with additional selected metal ion-containing aqueous solution.

In another embodiment of the invention, the concentrated aqueous solution including the said water-soluble polymer-metal complex is oxidatively destroyed to allow for recovery of the metal.

DETAILED DESCRIPTION

Figure 1:
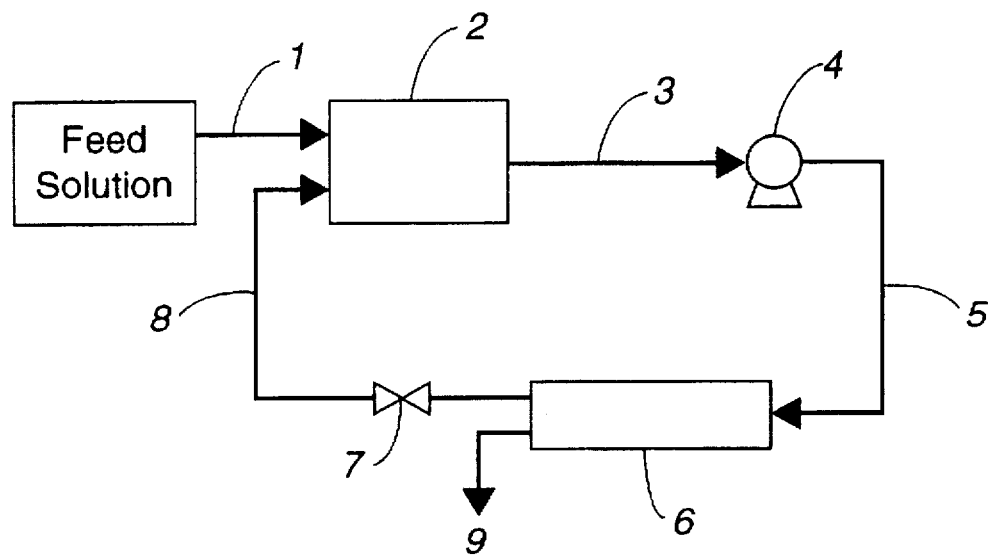
FIG. 1 illustrates a schematic diagram of an ultrafiltration process using a concentration mode of operation for metal-recovery from metal-containing aqueous waste streams.

The present invention is concerned with the separation of various metals, e.g., toxic metals and/or precious and/or nuisance metals from aqueous streams. Also, the present invention is concerned with recovery of the various metals after separation. After separation, such metals can be analyzed or recovered from the aqueous stream. In some instances, such ultra-low levels of a particular metal may be present that it cannot be detected by traditional analytical techniques and the present invention can serve as a preconcentration step prior to subsequent analysis for that particular metal.

Numerous aqueous streams containing one or more particular target metals for separation also include a variety of competing cations, anions, and/or organic material. To successfully separate the target metal or metals, the selected water-soluble polymer or polymers must have high selectivity for the target metal or metals in the presence of all the other competing cations (other metal ions) and anions (various counter ions) in solution.

Among the numerous aqueous streams including one or more particular target metals for separation are included brine solutions, urine, municipal waste waters, electroplating or metal finishing process streams, mining process and waste waters, photofinishing and/or printing waste waters, electronics industry waste waters, actinide processing waste waters, waste waters involving various oxoanions, textile industry waste waters, cooling tower waters, industrial catalyst-containing waste waters, drinking and contaminated aquifer waters, nuclear industry waste waters, oil-well waters and general industrial waste waters. Each aqueous stream can present a different set of problems in separation of target metals because of the presence of other materials. Yet, in each instance the metal separation or removal and often the recovery of target metals is an important problem to that particular area or industry. Various particular examples or embodiments of aqueous streams containing target metals are set out below.

In one embodiment of the present invention, the target metals for separation or recovery can exist within a brine solution, e.g., seawater, salt-mine brine, etc. Often, it is desirable to separate the target metals for recovery or disposal. The typical composition of sea water is shown below in Table A and includes large amounts of sodium and magnesium chloride complicating the separation or recovery.

TABLE A

Typical seawater composition (pH 7.9 to 8.4).

| Metals | ug/L |
|---|---|
| Cd | 0.07 |
| Co | 0.3 |
| Cr | 0.25 |
| Cu | 3 |
| Fe | 100 |
| Mn | 25 |
| Zn | 4 |
| Mg | $0.74 \times 10^6$ |
| Na | $6.1 \times 10^6$ |
| U | 3.3 (ppb as $UO_2$) |

A salt brine can typically have a composition as shown below in Table B. Recovery of specific metals from brine solutions is a common industrial, analytical, or environmental need.

TABLE B

Sample of simulated salt brine solution from Carlsbad, NM.

| Materials | Amount in g/L |
|---|---|
| $MgCl_2.6H_2O$ | 584.28 g |
| NaCl | 200.25 g |
| KCl | 114.39 g |
| $Na_2SO_4$ | 12.41 g |
| $Na_2B_4O_7.10H_2O$ | 3.91 g |
| $CaCl_2$ | 3.32 g |
| $NaHCO_3$ | 1.93 g |
| NaBr | 1.04 g |
| LiCl | 254.27 mg |
| RbCl | 54.73 mg |
| $SrCl_2.6H_2O$ | 30.69 mg |
| KI | 26.60 mg |
| $FeCl_3.6H_2O$ | 25.73 mg |
| CsCl | 2.63 mg |
| HCl(1N) | 0.30 ml |

In another embodiment of the present invention, the target metals for selective separation or recovery or concentration can exist within body fluids such as urine. For example, it can be desirable to test the urine of workers from certain jobs for the presence of metals such as actinides (e.g., plutonium) or toxic metals (e.g., lead). Generally, the salt and organic content of a body fluid, e.g., urine, is high, somewhat similar to that of seawater. A typical composition for a synthetic or simulated urine is shown below in Table C.

TABLE C

Composition of simulated urine.

| Components | g/kg | Component | g/kg |
|---|---|---|---|
| Urea | 16.0 | $NaH_2PO_4.H_2O$ | 2.73 |
| NaCl | 2.32 | $CaCl_2.2H_2O$ | 0.63 |
| KCl | 3.43 | Oxalic acid | 0.02 |
| Creatinine | 1.10 | Lactic acid | 0.094 |
| $Na_2SO_4$ (anhyd.) | 4.31 | Glucose | 0.48 |
| Hippuric acid | 0.63 | $Na_2SiO_3.5H_2O$ | 0.071 |
| $NH_4Cl$ | 1.06 | Pepsin | 0.029 |
| Citric acid | 0.54 | $CaCO_3.H_2O$ | 0.42 |
| $MgSO_4$ (anhyd.) | 0.46 | | |

In another embodiment of the present invention, the target metals for selective separation or recovery can exist in actinide or fission product-containing waste streams, e.g., at a waste water treatment facility at a nuclear facility or nuclear plant. The salt content of the waste stream can be high and is quite variable. This can complicate the separation of the actinides and or fission products to the required discharge limits. A typical composition for a waste stream of the Los Alamos National Laboratory (LANL) aqueous waste water treatment facility is shown below in Table D.

TABLE D

Composition of simulated waste water from site TA-50 treatment facility at LANL.

| Ion | Concentration Molar (M) | Salts | Concentration (grams/5 L) |
|---|---|---|---|
| $Ba^{2+}$ | $1.4 \times 10^{-7}$ | $Ba(NO_3)_2$ | 0.0001 |
| $Ca^{2+}$ | $2.9 \times 10^{-4}$ | $Ca(NO_3)_2.4H_2O$ | 0.7070 |
| $Cl^{-(a)}$ | $1.1 \times 10^{-3}$ | $NaCl(CuCl_2)$ | 0.0017 |
| $Cu^{2+}$ | $9.5 \times 10^{-7}$ | $CuCl_2.2H_2O$ | 0.0017 |
| $F^-$ | $1.1 \times 10^{-4}$ | NaF | 0.0504 |
| $Fe^{3+}$ | $4.6 \times 10^{-6}$ | $Fe(NO_3)_2$ | 0.0195 |
| $Mg^{2+}$ | $7.1 \times 10^{-5}$ | $MgSO_4$ | 0.0916 |
| $Ni^{2+}$ | $8.0 \times 10^{-5}$ | $NiCl_2.H_2O$ | 0.0020 |
| $Zn^{2+}$ | $1.9 \times 10^{-6}$ | $Zn(NO_3)_2$ | 0.0059 |
| $Nd^{3+}$ | $4.8 \times 10^{-9}$ | $Nd(NO_3)_3.6H_2O$ | trace |
| $NH_3$ | $1.2 \times 10^{-4}$ | $NH_4OH$ | 0.0510 |
| $NO_2^-$ | $2.3 \times 10^{-6}$ | $NaNO_2$ | 0.0017 |
| $NO_3^{-(b)}$ | $1.1 \times 10^{-2}$ | $NaNO_3$ | 6.3751 |
| $PO_4^{3-}$ | $4.3 \times 10^{-6}$ | $Na_2HPO_4$ | 0.0063 |
| $K^+$ | $9.0 \times 10^{-4}$ | KOH | 0.5459 |
| $Na^{+(c)}$ | $1.0 \times 10^{-2}$ | NaOH | 0.9320 |

(a)Chloride from both NaCl and $CuCl_2$.
(b)Present as zinc, calcium, and iron nitrate salts.
(c)Present from NaCl, NaF, $NaNO_3$, $NaNO_2$, and NaOH.

In another embodiment of the present invention, the target metals for selective separation or recovery include zinc and nickel from zinc and/or nickel electroplating or metal finishing dilute process streams. Such a stream also can generally contain materials such as ammonium salts, borate salts, sulfate salts, fluoroborate and/or chloride salts, organic chelators, e.g., tartrates or citrates, and metal impurities such as iron, copper, cadmium, lead, aluminum, and chromium making selective separation of the zinc and/or nickel difficult. Not only is it desirable to remove all these metal ions from the waste stream to render the total aqueous waste stream nonhazardous for discharge to a sewer system, it is desirable to selectively recover those metal ions, e.g., zinc and nickel, so they can be reused in plating baths. Table E lists the typical composition of a variety of zinc and nickel containing plating baths.

TABLE E

Composition of typical zinc and nickel containing electroplating baths*.

| Bath | Zinc/ L | Nickel/ L | Chloride/ L | Sulfate/ L | NH$_4$OH, NaOH, or NH$_2$SO$_3^-$/L | Additives/ L | Boric acid/L |
|---|---|---|---|---|---|---|---|
| Zn/Ni Alloy | 9.2 g | 18 g | 134 g | 0 | 56.6 g (NH$_4^+$) | 50 mL surfactant | 20.4 g |
| Watts Nickel | 0 | 87 g | 13 g | 114 g | 0 | 0.5 g Na-lauryl sulfate | 37 g |
| Nickel Sulfamate | 0 | 105 g | 0 | 0 | 344 g (NH$_2$SO$_3^-$) | 0.37 g anti-pitting | 30 g |
| Basic Zinc | 9 g | 0 | 0 | 0 | 75 g(NaOH) | 0 | 0 |
| Bright Acid Zinc | 43 g | 0 | 78 g | 0 | 15 g (NH$_4$OH) | 5% v/v brightener | 0 |

*Typical rinse waters would be expected to be approximately 100 times dilution from these values.

In another embodiment of the present invention, the target metals for selective separation or recovery include a variety of metal ions from electroplating or metal-finishing process streams. As exists for zinc and nickel metal finishing streams, such a stream also can generally contain materials such as ammonium salts, borate salts, fluoroborate salts, sulfate salts, and/or chloride salts, organic chelators, e.g., tartrates or citrates, and metal impurities making selective separation of the metal ion of interest difficult. Not only is it desirable to remove all these metal ions from the waste stream to render the total aqueous waste stream nonhazardous for discharge to a sewer system, it is desirable to selectively recover those metal ions, e.g., tin, copper, etc., so they can be reused, (e.g., in plating baths). Table F gives the components of a variety of typical electroplating or metal finishing baths. There are a large variety of these types of baths including single metal electroplating and electroless processes. There are a variety of metal alloy baths also, including brass and bronze which are copper and zinc and sometimes cadmium alloys; lead-tin, tin-copper, tin-nickel, and tin-zinc. Precious metals such as gold, silver, palladium, ruthenium, platinum, rhodium are also commonly used in plating operations. All these baths are composed of complex mixtures from which the metal ion of interest can be recovered.

TABLE F

Components of some typical plating baths.

| Bath Type | Components |
|---|---|
| Cadmium | Cadmium fluoborate, fluoboric acid, boric acid, ammonium fluoborate, licorice |
| Copper | Copper fluoborate, fluoboric acid |
| Tin | Tin-fluoborate, fluoboric acid, boric acid, stannous sulfate, sulfuric acid, cresol sulfonic acid, beta napthol, gelatin |
| Chromium | chromic acid, sulfuric acid |
| Lead | Lead fluoborate, fluoboric acid, boric acid, gelatin, hydroquinone |

In another embodiment of the present invention, the target metals for selective separation or recovery can exist in mining waste waters either from acid mine-water drainage or form actual mining processes. It is desirable to remove the controlled metals from the aqueous stream both as an environmental protection measure and/or to recover metal value from the aqueous stream. To recover the metal value it is necessary to selectively recover metals from other plentiful metals that occur in the aqueous stream. The composition of an example acid mine drainage stream, the Berkeley Pit in Butte, Montana, is shown below in Table G with the parts per million (ppm) of the respective element being the average value of four samples taken at different depth profiles in the pit.

TABLE G

Composition of Acid mine drainage water at the Berkeley Pit, Butte Montana.

| Element | ppm |
|---|---|
| Ca | 478 |
| Mg | 418 |
| Na | 69 |
| K | 18 |
| SiO$_2$ | 97.5 |
| Fe | 875 |
| Mn | 186 |
| Al | 279 |
| B | 0.40 |
| Cd | 1.67 |
| Cu | 184 |
| Li | 0.26 |
| Mo | 0.058 |
| Ni | 1.06 |
| Sr | 1.36 |
| Ti | 0.078 |
| V | 0.11 |
| Zn | 528 |
| As | 0.53 |
| Co | 1.75 |
| Cr | 0.055 |
| Cl | 12.0 |
| SO$_4$ | 7643 |
| NO$_3$ as N | 0.27 |
| F | 21.1 |
| pH | 2.68 |

In another embodiment of the present invention, the target metals for selective separation or recovery can exist in photofinishing and printing industrial waste waters. It is desirable to recover the precious metals from the aqueous stream both as an environmental protection measure and/or to recover metal value from the aqueous stream. To recover the metal value it is necessary to selectively recover metals from other plentiful materials that occur in the aqueous stream. The composition of an example photofinishing waste stream is shown below in Table H. Some specific organic compounds can also include acetate, benzyl alcohol, and formalin. The water-soluble polymer must have high selectivity and be able to compete with the thiosulfate to recover the metal values. Some processes can contain ammonium phosphate and sodium nitrate also. The presence of other toxic metals such as chromium along with silver requires the removal of all toxic metals and the recovery of the silver for its metal value.

TABLE H

Simulated mix of effluent from Kodak Ektaprint 2 chemicals (Bleach-fix, Low-flow wash, and final wash).

| Material | Amount per Liter |
| --- | --- |
| $(NH_4)_2S_2O_3$ | 1.35 mL as 58% solution |
| ammonium ferric ethylenediaminetetraacetic acid | 1.25 mL as 1.56 M solution |
| $Na_2SO_3$ | 0.05 g |
| silver | 160 mg |
| Kodak Ektaprint 2 developer replenisher | 3.5 mL |

In another embodiment of the present invention, the target metals for selective separation or recovery can exist in waste water from the electronics industry. It is desirable to recover the precious metals from the aqueous stream both as an environmental protection measure and/or to recover metal value from the aqueous stream. To recover the metal value it is necessary to selectively recover metals from other plentiful materials that occur in the aqueous stream. Trace impurities such as lead and nickel need to be removed from the waste streams also. The compositions of some example electronics waste streams that contain copper are shown below in Table I. Other aqueous streams can include gold from the manufacture of connectors and printed circuits. Impurity metals could include copper, silver, cobalt, lead, and nickel.

TABLE I

Typical formulations of acid copper plating used in circuit board applications.

Bath 1:

copper Fluoborate
Fluoboric acid
lead (major impurity problem)
Bath 2:

Copper sulfate
Sulfuric acid
chloride
proprietary additive
(e.g., thiourea, dextrin)
nickel and lead can be problems
Bath 3:

copper pyrophosphate
potassium pyrophosphate
potassium nitrate
ammonium hydroxide
Addition agent In another embodiment of the present invention, the target metals for selective separation and recovery can exist in low levels in actinide processing waste waters. After processing nuclear material for the recovery of plutonium and uranium, the remaining aqueous waste stream contains low levels of trivalent actinides and lanthanides. For proper waste management it is desirable to separate the long-lived actinide metal ions (e.g., americium) from the shorter-lived lanthanide metal ions (e.g., europium). Currently, such processes as liquid-liquid extraction are used to separate all the actinides from these waste streams. The lanthanides are simultaneously extracted with the trivalent actinides. The composition of an example process stream containing actinides and lanthanides waste stream is shown below in Table J. Use of water-soluble polymers provides efficient methods for separating these trivalent actinides from the trivalent lanthanide ions.

TABLE J

Composition of a typical actinide and lanthanide containing waste stream from light water reactors.

| Element | Quantity g/L |
| --- | --- |
| La | 0.25 |
| Y | 0.09 |
| Nd | 0.82 |
| Pr | 0.24 |
| Ce | 0.49 |
| Sm | 0.18 |
| Gd | 0.03 |
| Eu | 0.03 |
| Am | 0.03 |
| Cm | 0.007 |
| U | 0.04 |
| Np | 0.004 |
| Pu | 0.008 |

In another embodiment of the present invention, the target metals for selective separation or recovery can exist in a variety of industrial waste waters that produce or use oxoanions (e.g., molybdium, technetium, chromium, etc.) and/or waters that naturally contain oxoanions from runoff or natural environmental conditions (e.g., selenium, arsenic, etc.). It is desirable to remove the metal ions from the aqueous stream both as an environmental protection measure and/or to recover metal value from the aqueous stream, and/or for proper waste management practices. To recover the metal value it is necessary to selectively recover metals from other plentiful materials that occur in the aqueous stream. The composition of an example of a technetium-containing waste stream from the Hanford Tanks, in Hanford, Wash. is shown below in Table K, where it might be desirable to recover technetium.

TABLE K

Double-Shell Slurry (DSS) simulant formulation from Hanford tanks in Washington.

| Material | Source | Grade | Molarity |
| --- | --- | --- | --- |
| NaOH | Baker | Reagent | 0.783 |
| $NaAl(OH)_4$ | EM | Technical | 0.486 |
| $NaNO_3$ | Baker | Reagent | 1.498 |
| $NaNO_2$ | Baker | Reagent | 0.857 |
| $Na_2CO_3$ | Baker | Reagent | 0.385 |
| $Na_2SO_4$ | Baker | Reagent | 0.031 |
| NaCl | EM | Reagent | 0.093 |
| NaF | Baker | Reagent | 0.080 |
| $Na_3PO_4.H_2O$ | Baker | Reagent | 0.114 |
| $Ca(NO_3)_2.4H_2O$ | Mallinckrodt | Reagent | 0.002 |
| $K_2CrO_4$ | Baker | Reagent | 0.014 |
| $Na_3(Citrate).2H_2O$ | Baker | Reagent | 0.073 |
| $Li^{99}TcO_4$ | — | — | $5.0 \times 10^{-5}$ |
| $^{95m}Tc$ | — | — | $<10^{-9}$ |

Table L contains the typical concentration of a tungsten-containing electroplating bath where it is desirable to recover tungsten, as an oxoanion, in the presence of nickel.

TABLE L

Composition of nickel-tungsten alloy electroplating bath.

| Reagent | Quanitity in g/L* |
|---|---|
| $Na_2WO_4$ | 66 |
| $NiSO_4.6H_2O$ | 36.8 |
| Ammonium citrate | 97.7 |

*The quantity in rinse waters will be generally diluted approximately 100 times over these values.

In another embodiment of the present invention, the target metals for selective separation or recovery can exist in textile processes or waste streams. Generally, these aqueous streams can contain fiber particles, organic dyestuffs, process chemicals, and free or bound metal ions. Common metals that are used include copper and chromium. Typical compositions for textile waste streams have the characteristics shown below in Table M. Other metal-containing waste streams can include copper that is used in the production of dyestuffs for example in the manufacture of aromatic diazonium groups using the Sandmeyer reaction.

TABLE M

Typical characteristics of textile process streams.

| Sample | Sample A | Sample B | Sample C |
|---|---|---|---|
| pH | 10.7 | 4.5 | 4.5 |
| Primary heavy metal (mg/L) | Cu (575 ppm) | Cu (1000 ppm) | Cr (1000 ppm) |
| COD (mg/L)* | — | 65,000 | 65,000 |
| BOD (mg/L)* | — | 250 | 250 |
| Suspended solids (%) | — | 1–2 | 1–2 |
| Total Solids (%) | — | 5–6 | 5–6 |
| Water Hardness (mg/L) (mg/L as $CaCO_3$) | — | soft (50–70) | soft (50–70) |

*Organic dyestuffs are mostly azo and diazo dyes in these examples.

In another embodiment of the present invention, the target metals for selective separation or recovery can exist in cooling tower waters and cooling waters or waste streams. Generally, the aqueous streams can contain corrosion products such as nickel and cobalt and corrosion inhibitors such as chromium. Depending upon the type of cooling tower other metal ions could be present in low levels such as calcium, magnesium or iron. If the cooling water comes from nuclear power plants, other metals such as strontium and silver could be present including activation products or spallation products. It is desirable to remove metals from these streams as some are hazardous and others cause scaling problems.

In another embodiment of the present invention, the target metals for selective separation or recovery can exist in catalyst-containing industrial waste water. It is desirable to recover the precious metals from the aqueous stream both as an environmental protection measure and/or to recover metal value from the aqueous stream. To recover the metal value it is necessary to selectively recover metals from other materials that occur in the aqueous stream. The composition of an example catalyst containing waste stream is shown below in Table N. The presence of other toxic metals along with the primary metal requires the removal of all toxic metals and the recovery of, e.g., copper, nickel, platinum, palladium, or rhodium, for its metal value.

TABLE N

Composition of several typical catalyst-containing waste streams.

| Industry Type | Metals found in Stream |
|---|---|
| Auto catalytic converters | Platinum, copper, rhodium, palladium |
| Chemical manufactures | Nickel, copper, cobalt, tin |

In another embodiment of the present invention, the target metals for selective separation or recovery can exist in drinking waters as dilute contaminates that arise from sitting in, for example, leaded pipes or containers that have lead solder or from aquifer water that has become contaminated from hazardous metal runoff or from some other mechanism. It is desirable to remove the toxic metal ions from the aqueous stream before it is used for human consumption. To remove the metal ion to very low levels for drinking water standards requires that the water-soluble polymers have very high binding constants such that they can remove metals to very low levels. The concentration maximums of controlled metal ions for drinking water standards are shown below in Table O.

TABLE O

EPA drinking water standards for controlled metals.

| Metal Ion | Concentration (mg/L) |
|---|---|
| arsenic | 0.1 |
| cadmium | 0.005 |
| chromium | 0.1 |
| copper | 1.3 |
| lead | 0.015 |
| mercury | 0.002 |
| nickel | 0.1 |
| selenium | 0.05 |
| uranium | 0.02 |
| alpha emitter | 15 pCi/L |

The water-soluble polymers useful in practicing the present invention are synthetic water-soluble polymers, i.e., they are not naturally occurring water-soluble polymers such as starch, cellulose, and the like and do not involve modified naturally occurring water-soluble polymers. The water-soluble polymers used in the present invention generally include a nitrogen-, oxygen-, or sulfur-containing group. Exemplary of the water-soluble polymers used in the present invention are polyalkyleneimines such as polyethyleneimine and modified polyalkyleneimines, i.e., polyalkyleneimines such as polyethyleneimine where the water-soluble polymer includes functionalization selected from the group consisting of carboxylic acid groups, ester groups, amide groups, hydroxamic acid groups, phosphonic acid groups, phosphonic ester groups, acylpyrazolone groups, aza-crown ether groups, oxy-crown ether groups, guanidium groups, thiolactam groups, catechol groups, mercaptosuccinic acid groups, alkyl thiol groups, and N-alkylthiourea groups. In addition to polyethyleneimine as the basic structure of many of the water-soluble polymers, other water-soluble polymer structures with nitrogen-containing groups such as poly (vinylamine), polyvinylpyridine, poly(acrylamide), and poly (allylamine), can be used. Also, water-soluble polymer structures with oxygen-containing groups such as poly (vinylalcohol) or oxygen- and nitrogen-containing groups such as polyvinylpyrrolidone can be used. The amine backbones can also be permethylated to give permethylated polyethyleneimine, permethylated polyvinylpyridine, permethylated polyallylamine, or permethylated polyvinylamine. Water-soluble polymers can be constructed from vinyl monomer polymerization reactions to give a number of groups, copolymer of acrylamide or acrylic acid and bisphosphonic esters and acids. Water-soluble polymers with metal binding properties can be obtained from ring-opening reactions, e.g., the treatment of polypyrrolidone with base or hydroxylamine.

Exemplary of suitable functionalized water-soluble polymers are the reaction product of polyethyleneimine and an arylalkylhaloacetylpyrazolones such as phenylmethylchloroacetylpyrazolone or dimethylchloroacetylpyrazolone to yield a phenylmethylacetylpyrazolone-substituted or dimethylacetylpyrazolone-substituted polyethyleneimine, the reaction product of polyethyleneimine (polyallylamine, polyvinylamine) and a halocarboxylic acid such as bromoacetic acid or chloroacetic acid to yield an aminocarboxylate-substituted polyethyleneimine (polyallylamine, polyvinylamine), the reaction product of polyethyleneimine (polyvinylamine, polyallylamine) and phosphorous acid and formaldehyde to give a phosphonic acid substituted polyethyleneimine (polyvinylamine, polyallylamine), the reaction of polyethyleneimine and a monohydroxamic acid of succinic acid to give a hydroxamic acid substituted polyethyleneimine, the reaction of polyethyleneimine with acrylamide or ethylacrylate to give an ester or amide substituted polyethyleneimine, the reaction of vinylalcohol with a crown alcohol to give an oxycrown substituted vinylalcohol, the permethylation of polyvinylpyridine or polyethyleneimine or polyvinylamine or polyallylamine to give the respective permethylated polymers, the ring opening of polypyrrolidone with hydroxylamine to give the hydroxamic acid polymer, the copolymerization of a beta-bisphosphonic acid or ester with acrylamide or acrylic acid to give a copolymer, the reaction of polyethyleneimine with a beta-bisphosphonic acid or ester to give bisphosphonic acid or ester polyethyleneimine, and the reaction product of polyethyleneimine and a haloacetylaza crown material such as a chloroacetylaza crown ether to yield an aza crown ether-substituted polyethyleneimine.

When the polyethyleneimine is functionalized, care must be taken to control the level of functionalization as solubility problems at certain pH values can exist depending upon the type of functional groups and backbone used. The water-soluble polymers used in the present process preferably maintain their water solubility over the entire pH range of, e.g., pH 1 to 14. Preferably, any polyethyleneimine used in the present invention includes primary, secondary and tertiary amines. Bisfunctionalization can be realized for primary nitrogens allowing for multidentate character of some of the chelating groups. The polyethyleneimine is a branched polymer, giving it a globular nature and high charge density which partly accounts for its uniqueness in the polyamine family of polymers. This highly branched character also allows for better binding site interactions with metal ions within the polymer. Other polyamines, i.e., polyvinylamine and polyallylamine, can be used as backbones, and are composed of all primary nitrogens, but they are linear polymers and if over functionalized can lead to insolubility in different pH ranges.

The use of prepurified (sized) polymer is critical to the process. Use of pre-purified polymer in the functionalization of, e.g., polyethyleneirine, has the advantage that reagents used in the functionalization steps are not lost on low molecular weight polyethyleneimine that will be lost in subsequent purification of the functionalized polymers. Further, it gives an extra margin of assurity that there will be no polymer leakage during the use of the polymers in the process.

Conditions in the preparation of the water-soluble polymers are important to assure that there is no detectable leakage through the ultrafiltration membrane during the process. Several factors are important in aiding the presizing of the water-soluble polymers; the polymer concentration, the pH value, and the ionic strength at which the polymers are presized are all important. Because water-soluble polymers can aggregate in solution and because the polymers can expand or contract in size, conditions that effects these tendencies should be controlled. For example, it is known that polyethyleneimine can change it average size by 60% between a basic and acidic solution (larger in the acidic solution and smaller in basic). Thus, polyethyleneimine should be prepurified at the pH where its size is smallest to further assure the smaller fragments are remover from the larger fragments (at a pH of about 10–11). Other polymers because of either their neutral, anionic, or cationic nature will have different optimum pH values for prepurifying depending upon the pH that gives the smallest polymeric volume in solution. The ionic strength of a solution can also effect the polymeric volume in solution similarly to pH effects. If polymer concentration are too high in solution they will aggregate, again effecting the potential ability of obtaining polymers that are not going to leak through the membranes during the process.

The prior art in the preparation of polyethyleneimine or other water-soluble polymers for use in metal separations has been quite vague in how it is prepared and treated for use in ultrafiltration techniques. At best, literature procedures report polymer solutions were prepared by prefiltering through the same size molecular weight cutoff (MWCO) membrane that was used in the experiment, with no detail as to pH or concentration or ionic strength. It is believed that this partially provides the reason why the general concept of polymer filtration has been preliminarily tested and proposed at the laboratory bench scale for over 10 years, yet the process has not been commercially practiced.

The present process to purify polyethyleneimine is unique in that the purification scheme does not clog the ultrafiltration membranes. In contrast, some polyethyleneimine manufacturers have been unable to develop a purification technique for sizing the polymer using ultrafiltration without severely and irreversibly clogging the membranes. Note that one other main use of polyethyleneimine is as an adhesive and polyethyleneimine is known to bind to many surfaces, especially cellulose and anionic surfaces. Polyethyleneimine has been reported to be fractionated by size using GPC (size exclusion chromatography), precipitation, and by exhaustive dialysis. Average molecular weight determinations were performed by osmometry, ultracentrifugation, viscometry, and light scattering techniques. Generally, the literature refers to determining the average molecular weight instead of producing fractions that do not pass an absolute molecular weight cutoff.

The water-soluble metal-binding polymer can be used in several potential compositions for selective separation of metal ions. There can be a single polymer that will bind selectively with only one metal ion over all other ions and materials under the conditions of the process. Separation is achieved by binding that metal ion to the water-soluble polymer and then using a separation technique such as ultrafiltration to remove the water and other materials from the polymer. The polymer-bound metal ion is thus concentrated. The polymer-bound metal can be released from the polymer by a variety of processes as shown in the following equations:

$$M(P)+H^+ \rightarrow HP+M^x \quad (eq.\ 1)$$

$$M(P)+L \rightarrow ML+(P) \quad (eq.\ 2)$$

or $$M(P)+e^- \rightarrow M^x+(P) \quad (eq.\ 3)$$

where M is the metal ion, (P) is the water-soluble polymer, L is a competing complexant, $H^+$ is a proton, x is the valent state of the metal, and $e^-$ is an electron for an oxidation change reaction. Where the metal is released by a proton (eq. 1) or by a competing molecular ligand (eq. 2), the polymer-free metal ion is recovered by a diafiltration process. In some instances, the metal ion may be so tightly bound to the polymer that it is more desirable to heat process the concentrate to destroy the polymer (incineration, hot acid digestion, smelting, etc.) and recover the metal. Optionally, for waste management purposes it may be desirable to solidify the polymer-bound metal, e.g., in a grout or cement material, such that it passes EPA toxic leach tests (TCLP).

Another potential composition can include a single polymer that will bind with a combination of metal ions under the process conditions. Separation and selectivity is realized by binding that combination of metal ions then using a separation technique such as ultrafiltration to remove the water and other materials from the polymer-metal complexes. The polymer-bound metals can be selectively released from the polymer by a variety of processes as shown above in equations 1, 2, and 3. Where the selected metal is released by protons (eq. 1) or by a competing molecular ligand (eq. 2), the polymer-free metal ion can be recovered by a diafiltration process. Stripping of the polymer is repeated until all the desired metals have been selectively recovered. Again in some instances, the metal ions may be so tightly bound to the polymer that it is more desirable to heat process the concentrate to destroy the polymer to recover the metals. Optionally, for waste management purposes it may be desirable to solidify the polymer-bound metal, e.g., in a grout or cement material, such that it passes EPA toxic leach tests (TCLP).

Still another composition uses a polymer formulation (two or more polymers of same molecular weight range) blended in such a ratio and with such functionality to have the desired selectivity that binds a combination of metal ions under certain conditions of pH, counter ion, and/or ionic strength. Separation is achieved by binding the metal ions to the water-soluble polymers and then using a separation technique such as ultrafiltration to remove the water and other materials from the polymer. The mixed polymer-bound metals are thus concentrated and can be further purified by washing with a clean solution in a diafiltration process to remove any final impurities. The polymer-bound metals can be selectively released from the polymers by a variety of processes as shown in equations 1, 2, and/or 3. When the process uses equation 1 and/or 2, the water-soluble polymers may be selectively stripped of the respective metal or group of metals by, e.g., appropriate pH control into a range whereat one polymer is stripped of its particular metal while the second water-soluble polymer retains its particular metal as a water-soluble polymer-bound metal. The second and subsequent polymers can be stripped of the remaining metal ions as desired for the separation process and the regeneration of the polymers for further reuse in the separation process.

Still another composition uses a polymer formulation (two or more polymers of different molecular weight range) blended in such a ratio and with such functionality to have the desired selectivity that binds a combination of metal ions under certain conditions of pH, counter ion, and/or ionic strength. Separation is achieved by binding the metal ions to the water-soluble polymer and then using a separation technique such as ultrafiltration to remove the water and other materials from the polymer. The mixed polymer-bound metals are thus concentrated and can be further purified by washing with a clean solution in a diafiltration process to remove any final impurities. The polymer-bound metals can be selectively released from the polymers by a variety of processes as shown in equations 1, 2, and/or 3. When the process uses equation 1 and/or 2, the water-soluble polymers may be selectively stripped of the respective metal ions or group of metal ions by, e.g., appropriate pH control into a range whereat one polymer is stripped of its particular metal while the second water-soluble polymer retains its particular metal as a water-soluble polymer-bound metal. The second and subsequent polymers can be stripped of the remaining metal ions as desired for the separation process and the regeneration of the polymers for further reuse in the separation process. Alternatively, since the water-soluble polymers are of different size ranges, it is possible to remove the metal from one polymer by the equations 1 to 3, and to separate the smaller polymer containing one type of functionality from the larger polymer with a different type of functionality. One of the functionalities is chosen to bind the metal ion of interest so tightly that the polymer that contains that functionality and the bound metal ions can be size separated from the other size polymer(s).

Another composition can include a single polymer or formulation of polymers that will bind with a single metal ion or a combination of metal ions under the conditions of the method. Separation and selectivity is realized by binding that combination of metal ions to the water-soluble polymer or polymers, then using a single pass separation technique such as ultrafiltration to remove the water and other materials from the polymer-bound metals. The polymer-bound metals are further concentrated to dryness or near dryness onto a flat ultrafiltration membrane. The membrane is either dissolved or digested in appropriate medium or leached with an appropriate acid or ligand to totally recover the metals that were on the membrane. The recovered solution which constitutes a concentrate of selected metal ions from the original solution can then be analyzed using appropriate analytical instrument or wet chemistry techniques.

Another composition can include a single polymer or formulation of polymers that will bind with a single metal ion or a combination of metal ions under the conditions of the process. Separation is achieved by binding the selected metal ions to the water-soluble polymer or polymers and then using a separation technique such as biphasic liquid-liquid extraction to remove other materials and unbound metal ions from the aqueous polymer solution. The metals that are unbound to the polymer and go into the organic or second phase are separated from the polymer-containing aqueous phase by standard phase separation techniques, e.g., mixer settlers, liquid extraction membranes, or centrifugal contactors, etc. The metals can be back-extracted from the second phase to another aqueous phase for recovery purposes. The polymer can be regenerated from the aqueous stream by first concentration ultrafiltration followed by diafiltration. This process can be done in reverse by back extracting the metal ion of interest from a biphasic system using aqueous solutions of the water-soluble polymer.

Generally, the concentration of the water-soluble polymer is from about 0.001 weight to volume percent to about 25 weight to volume percent of final mixed solution, more preferably from about 0.001 weight to volume percent to about 5 weight to volume percent of final solution. It is sufficient, and in some cases desirable, to have only enough polymer in solution such that the molar ratio of polymer to metal ions in solution is one. Using high concentrations of the water-soluble polymer can most often result in a lower flux or flow during an ultrafiltration stage. The use of high polymer concentration can also cause an aggregation effect where no or little metal ion binding occurs to the polymer when the metal ion encounters a high initial concentration of polymer. During the ultrafiltration stage the polymer and metal bound polymer concentration can often become quite high and in the case where the solution goes to near dryness it can approach 90% of the weight of the concentrate.

After the solution containing the water-soluble polymer is contacted with the aqueous metal-containing solution for a sufficient period of time to form water-soluble polymer-metal complex, separation of the water-soluble polymer-metal complex is preferably accomplished by ultrafiltration. Ultrafiltration is a pressure driven separation occurring on a molecular scale. As a pressure gradient is applied to a process stream contacting the ultrafiltration membrane, liquid including small dissolved materials is forced through pores in the membrane while larger dissolved materials and the like are retained in the process stream. Pressure gradients can be created, as desired, from the use of vacuum systems, centrifugal force, mechanical pumping, and pressurized air and/or gas systems (e.g., nitrogen).

In a continuous or semicontinuous ultrafiltration stage, the solution containing the water-soluble polymer-metal complex is passed through an ultrafiltration unit as shown in FIG. 1. Referring to FIG. 1, the process for displacing cyanide ion from the metal-cyanide complex by the water-soluble polymer includes the following steps: a metal-cyanide-containing feed solution is added via line 1 to a solution of the water-soluble polymer in tank 2. This reaction mixture is conveyed via line 3, pump 4, and line 5 to separations means 6. Generally, the separations means 6 preferably is an ultrafiltration membrane, having a MWCO less than the molecular weight of the water-soluble polymer. The separation is normally accompanied by recirculating the mixture through the membrane device having a throttle valve 1 in line 8 to maintain a pressure of less than 60 psi in the membrane unit with 25 psi being preferred. The aqueous solution which permeated through the membrane is collected as effluent 9 which contains the free cyanide. The cyanide can be destroyed or the cyanide solution reused.

Both the water-soluble polymer-metal complex and any free, i.e., uncomplexed, water-soluble polymer are optimally retained by the membrane of the ultrafiltration unit, i.e., they do not pass through the membrane as permeate, while the solvent and unbound materials, i.e., water and small molecules, can pass through the membrane as permeate.

Figure 2:
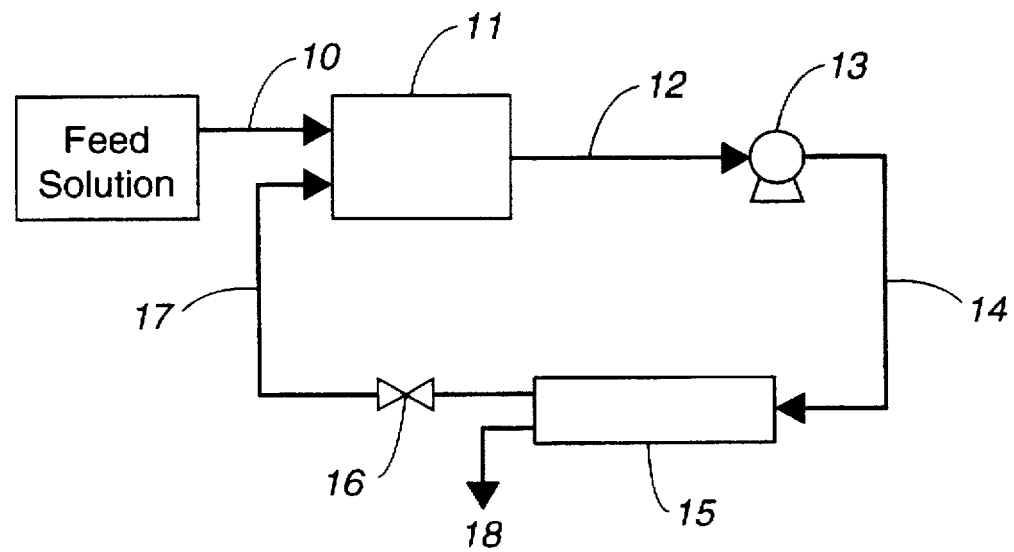
FIG. 2 illustrates a schematic diagram of an ultrafiltration process using a diafiltration mode of operation for metal ion recovery from a metal-loaded, water-soluble polymer.

The retention of solute during ultrafiltration depends on the membrane pore size. Though the molecular weight cut-off (MWCO) is generally defined as the molecular weight of spherical uncharged solute which is 90 percent retained by the membrane, preferably in the present invention less than 0.001% (<1 ppm) of the polymer can penetrate the membrane. This low penetration is achieved by prepurification of the water-soluble polymer material during their preparation or synthesis. By use of ultrafiltration, the water-soluble polymer-metal complex can be separated from the solution whereafter the metal can be separated from the water-soluble polymer-metal complex for recovery, recycling, or disposal as desired. Generally, for these applications the polymer or polymer formulation is prepared such that there is no detectable breakthrough of polymer through the membrane. This is achieved by prepurifying the water-soluble at one MWCO and running the process at a MWCO less than that MWCO. Polymer leakage can be detected or monitored in several ways. First, the total organic carbon of the permeate can be determined. Since the polymers contain substantial amounts of carbon, the polymers can be detected to the 1 ppm range of carbon. The second method is a color test where the polymer can bind copper and cause a color change and enhancement. This can be detected to the <1 ppm level. Generally, there are two modes of operation in ultrafiltration. The first is a batch or concentration mode, as shown in FIG. 1, where the volume in the retentate is reduced by simple filtration. The second mode is diafiltration with the ultrafiltration unit as shown in FIG. 2. Referring to FIG. 2, the process for recovering metal-ions from the metal-loaded water-soluble polymer includes the following steps: a metal stripping solution, e.g., dilute mineral acid, is added via line 10 to a solution of the water-soluble polymer in tank 11. This reaction mixture is conveyed via line 12, pump 13, and line 14 to separations means 15. Generally, the separations means 15 preferably is an ultrafiltration membrane, having a MWCO less than the molecular weight of the water-soluble polymer. The separation is normally accompanied by recirculating the mixture through the membrane device having a throttle valve 16 in line 17 to maintain a pressure of less than 60 psi in the membrane unit with 25 psi being preferred. The aqueous solution which permeated through the membrane is collected as effluent 19 which contains the metal concentrate. The metal ions can be reused or treated for proper waste management.

During diafiltration, as permeate is generated, solute-free liquid, i.e., water or appropriate solution, is added to the retentate at the same rate as the permeate is generated thereby maintaining constant volume within the ultrafiltration unit. In diafiltration, the lower molecular weight species in solution are removed at a maximum rate when the rejection coefficient for that species equals zero. The ultrafiltration process can be performed in a variety of configurations, for example, in a simple concentration mode, a concentration mode followed by diafiltration mode, or a concentration mode slip streamed continuously to a diafiltration mode. In some modes of operation biphasic extraction occurs prior to the ultrafiltration.

In the present process, the ultrafiltration unit can generally consist of hollow-fiber cartridges with membrane material having a 1,000 MWCO to 1,000,000 MWCO preferably 10,000 MWCO to 100,000 MWCO. Other membrane configurations such as spiral-wound modules, stirred cells (separated by a membrane), thin-channel devices, centrifuge units (separated by a membrane) and the like may also be used although hollow-fiber cartridges are generally preferred for the continuous/semicontinuous process filtration units. For analytical applications for preconcentration purposes stirred cells and centrifuge ultrafiltration units are preferred. Small hollow-fiber cartridges also can be used for continuous preconcentration for analytical applications. Among the useful ultrafiltration membranes are included cellulose acetate, polysulfone, and polyamide membranes such as polybenzamide, polybenzamidazole, and polyurethane.

The use of ultrafiltration for separation is further described in Kirk Othmer: Encyclopedia of Polymer Science and Engineering, 2nd Ed., vol. 17, pp. 75–104, 1989, such description incorporated herein by reference.

Generally, the water-soluble polymers used in the present process have molecular weights of from greater than 1,000 to about 1,000,000, and preferably from greater than 10,000 to 100,000. Above molecular weights of 1,000,000, some polymers tend to lose solubility, while with polymers below molecular weights of about 1000, retention by suitable ultrafiltration membranes can present problems such as low flux rates. More preferably, the water-soluble polymers used in the present invention have distinct molecular weight ranges, i.e., they have been sized to exclude molecular weights below a certain value and optionally above a certain value. This sizing can be accomplished by filtering the particular water-soluble polymer through polysulfone ultrafiltration membranes such as e.g., UFP-10-C-5 membranes from AG Technologies, Corp. with a particular molecular weight cutoff value. These resultant compositions, i.e., sized water-soluble polymers have particularly exceptional utility in the separation of metals. Generally, a MWCO of 1000 difference between the first higher range and the second lower range should be sufficient to meet the needs of the present process. For example, the polymers could be sized or pre-purified at 20,000 MWCO and then ultrafiltration membranes of 19,000 MWCO used in the process. The present description and specific examples shown hereinafter detail a process based on the presently commercially available ultrafiltration membranes which at this time are limited to suitable polysulfone membranes with 10,000 MWCO, 30,000 MWCO and 100,000 MWCO from AG Technologies, Inc. Other MWCO's are presently unavailable but when available would provide additional options to the present process.

The water-soluble polymers, e.g., the sized water-soluble polymer compositions, may further be useful in the separation of organic moieties or biological moieties in a process akin to affinity chromatography except that the process would be a single phase process rather than a column chromatography resin based process. For example, as for metal binding, there is an equilibrium constant (K) for the equation $$E+S<=>ES$$

where S is a substrate and E is an enzyme (or any biological macromolecule that can bind to a substrate) to yield an enzyme-substrate complex (ES). The size of the equilibrium constant (K) determines the complex stability or strength. When K is large, the complex should be able to be formed nearly quantitatively in one contact or stage. Once the complex is formed, assuming either S or E is attached to a water-soluble polymer, a separation and concentration from species that are in the solution that have very small K values or no binding ability should be possible using ultrafiltration as the physical separation process similar to that described above for metals separation. Once the unbound components have been diafiltered from the system, the ES complex can be dissociated with appropriate reagents and either E or S can be recovered from the system. This process or affinity polymer filtration is related to the commonly used process of Affinity Chromatography where solid resins are used in a similar fashion in a chromatographic mode. Similarly, if E and S are small organic molecules that have special affinities for each other, small organic molecules can also be separated. For example, if S is a phosphonate ester, it can bind with carboxylic acids such as acetic acid or formic and effect a separation.

Initially, evaluation of water-soluble polymer size, substrate linker arm lengths, appropriate linker arms, and the presence of other macromolecules within the system that would require separating is conducted. Then, using standard linking chemistry that is currently used for binding substrates to gels (agarose or Sepharose, etc.) that are used in affinity chromatography, appropriate substrates are bound to e.g., polyvinyl alcohol or polyethyleneimine (PEI). For example, the inhibitor for Staphylococcal Nuclease can be attached to a spacer arm connected to PEI by linking a carboxylic acid (e.g., bromoacetic acid) to the primary amine in PEI using a coupling reagent, (1-ethyl-3-(3-dimethylaminopropyl)carbodiimide) at pH 4.7. Then, the primary aniline amine group can attach the inhibitor, pdTp-aminophenyl, by displacement of the bromo group on the carboxylic acid. Through these types of standard linking chemistries a variety of substrates can be attached (P. Cuatrecasas, J. Biol. Chem. volume 245, page 3059, 1970). When a mixture containing the enzyme to be purified is then contacted with the water-soluble polymer containing the substrate, binding will take place. The impurities will be removed by diafiltration, the enzyme concentrated by ultrafiltration, and the enzyme recovered by appropriate displacement chemistry followed by diafiltration to recover the enzyme.

The water-soluble polymers can be of the type described by Smith et al., in U.S. patent application serial number xxx,xxx, filed concurrently herewith, entitled "Water-Soluble Polymers", can be used in the recovery of metals from solids as described by Smith et al., in U.S. patent application serial number xxx,xxx, filed concurrently herewith, entitled "Water-Soluble Polymers for Recovery of Metals from Solids", can be used for the displacement of cyanide ions from metal-cyanide complexes as described by Smith et al., in U.S. patent application serial number xxx,xxx, filed concurrently herewith, entitled "Process for the Displacement of Cyanide Ions from Metal-Cyanide Complexes", each of the above mentioned descriptions incorporated herein by reference.

Though the thrust of this invention has been the use of water-soluble metal-binding polymers to bind, remove, and recover metal ions from aqueous solutions, it is also possible that metal ion impurities can exist in organic solutions. Such organic solutions can include glycols from radiators, used oils from automobiles, and other organic solvents that become contaminated with metal ions. With minimal modifications to the polymers to enhance their organic solubility, and with improvement in membrane technology such that a variety of organic solutions can be easily ultrafiltered, this same process can be employed for application to the binding, removal and recovery of metals from organic solutions.

The present invention is described in more detail in the following examples which are intended as illustrative only, since numerous modification and variations will be apparent to those skilled in the art. Examples A-BB show the preparation of PEI, PEI derivatives, and other water-soluble chelating polymers used in the present process, while Examples 1-25 show the process of separating metals from various aqueous streams using the example polymers.

EXAMPLE A (polymer A)

The polyethyleneimine (PEI) was prepared as follows. Crude polyethyleneimine (obtained from BASF as Polymin Waterfree PEI and as PEI homopolymer P) was obtained in two molecular weight ranges. The Polymin Waterfree polymer was reported to have a molecular weight in the range of 10,000 to 25,000, while the PEI homopolymer P was reported to have a molecular weight range of 70,000 to 750,000, depending upon the method of molecular weight measurement. In reality both of these polymer had a broad molecular weight range and had material that passed through ultrafiltration membranes that had 10,000 MWCO and 30,000 MWCO and 100,000 MWCO. These polymers from BASF were highly branched having a primary to secondary to tertiary nitrogen ratio of approximately 1:2:1.

To demonstrate the effect of pH on polymer size a 1 wt/vol % solution of polymin water free was adjusted with acid or base to span the pH region between 2 and 10. The solutions were diafiltered through a 30,000 MWCO membrane with permeate samples taken periodically to determine polymer concentration using the copper method described below. The concentration of polymer permeating the membrane at a high pH was considerably greater (0.014% at 15 min) than that passing through at lower pH values (0.003% at 15 min). The largest difference occurred between pH 10 and 8, with the sequential lowering of the pH leading to smaller effects on the polymer size, with very little difference in size at a pH of 4 and 2. Due to this dramatic change in polymer size, polyethyleneimine was purified by diafiltration at a relatively high pH value (pH 10.8 for PEI).

The polymer was purified using hollow-fiber membranes prepared by a special extrusion process (ultrafiltration membrane cartridges prepared from polysulfone material in a special homogeneous fiber construction) such that the microporous structure does not have macrovoids. Membranes such as UFP-10-C-5 (currently manufactured by AG Technologies, Corp.) were the only type of material found at this time to purify polyethyleneimine and allow for membrane washing to recover full flux rates after substantial use.

The polyethyleneimine was diluted in water to approximately 10–15% by weight. The pH was about 10.5 upon dissolution of the polyethyleneimine. The solution was diafiltered using 10,000 MWCO, 30,000 MWCO, and 100,000 MWCO membranes (keeping the volume constant) until 6–7 volume equivalents of water were passed through the system at less than or equal to 25 PSI. Following the diafiltration step, the solution volume was reduced approximately 85% to concentrate the polymer. The remaining water was removed under vacuum and mild heat to yield colorless, viscous purified polyethyleneimine. Thus, with polymin waterfree 25% by weight PEI came through the 10,000 MWCO membrane, 10% by weight PEI came through the 30,000 MWCO and not the 10,000 MWCO membrane, and 65% by weight was retained by the 30,000 MWCO membrane (this fraction referred to hereinafter as polymer Aa). With the Polymin P polymer 16% by weight passed through the 10,000 MWCO membrane, 3% by weight was less than 30,000 MWCO and greater than 10,000 MWCO, 5% by weight was less than 100,000 MWCO and greater than 30,000 MWCO, and 76% by weight was greater than 100,000 MWCO (this fraction referred to hereinafter as polymer Ab). The material resulting from the retentate from the 30,000 MWCO (polymer Aa), when filtered on a 10,000 MWCO membrane, gave no detectable passage of the polymer through a 10,000 MWCO membrane using a copper test developed to detect less than 1 ppm of polyethyleneimine polymer. Similarly for material collected at greater than 100,000 MWCO (polymer Ab) when tested on a 30,000 MWCO membrane no detectable polymer was observed in the permeate. For some applications the polymer concentrate did not require drying but could be concentrated to a workable volume as subsequent functionalization reactions were performed in water.

The copper test involved placing 0.5 mL of the test sample into a 10 mL volumetric flask, adding 0.5 mL of a copper acetate solution (1.99 g of copper acetate diluted to 100 mL with 0.01M HCl), 1.0 mL of pH 5.8 buffer (0.6 mL of acetic acid diluted to 100 mL with deionized water with addition of 11.2 g of anhydrous sodium acetate and sufficient sodium acetate or acetic acid to adjust pH to 5.8), and deionized water to dilute to mark. This solution was mixed well. A standard curve for an UV-VIS spectrophotometer was prepared using 0.01%, 0.02%, 0.05%, and 0.08 wt/vol % solutions of PEI. A reagent blank was used as a reference sample and read at 284 nanometers.

The specifications for the ultrafilration membrane included hollow-fibers of a material to which polyethyleneimine does not adhere to any significant extent, i.e., detrimental effect on flux. The routine operational pH range of the cartridges fell between 2 and 12 with the ability to process solutions down to a pH of 0 to 1 for limited periods of time (30 min) without damage to the cartridges. Minimum flux rates were 0.01 gallons/min/sq.ft. at 25° C. and at a transmembrane pressure of 15 PSI with a solution of 5% by weight branched polyethyleneimine (Polymin Waterfree 10,000–25,000 MW). Original flux rates of the cartridge were readily regenerated after use by a simple cleaning process of a 10 minute flush with water followed by 30 min with 500 ppm hypochlorite and rinsing with water. The cartridge had at least a minimum operational pressure of 50 PSI at 25° C. The cartridges had the ability to be operated at temperatures up to 80° C.

EXAMPLE B (polymer B)

An amino-carboxylic acid containing water-soluble polymer of the structure:

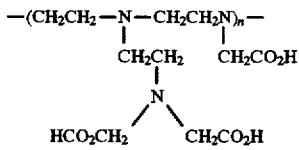

was prepared on polyethyleneimine (PEI, Polymin Waterfree used as received from BASF, i.e., unpurified)) using a molar ratio of carboxylic acid moiety to sub-units of $CH_2CH_2N$ within the PEI of about 4 to 1 as follows: A solution of potassium hydroxide (260.4 g) in water (400 mL) was added dropwise over a period of 30 minutes to a solution of polyethyleneimine (25.02 g) and bromoacetic acid (322.4 g) in water (500 mL) keeping the temperature below 50° C. After the addition was complete, the solution was stirred at reflux for 3 hours. The solution was cooled to room temperature then diluted to 2 liters with deionized water. The pH of the solution was adjusted to 5.8 using potassium hydroxide or hydrochloric acid. The polymer was purified by diafiltration collecting five volume equivalents of permeate using hollow fiber cartridges with a 30,000 MWCO. The retentate solution was then concentrated and the remaining water was removed under reduced pressure. The residual material (referred to hereinafter as polymer B) was dried in a vacuum oven at 60° C. overnight to give 50.78 g of a light tan brittle solid. IR (ATR): 1630 cm$^{-1}$ (C=O). Elemental Analysis Found: C, 32.58%; H, 4.97%; N, 8.54%; O, 28.99%.

EXAMPLE C (polymer C)

A partially functionalized carboxylic acid containing water-soluble polymer of the following structure:

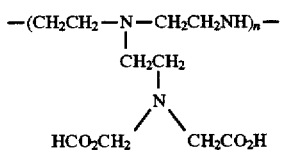

was prepared on polyethyleneimine (BASF, Polymin Waterfree, purified as in Example A, >30,000 MWCO) using a molar ratio of carboxylic acid moiety to sub-units of $CH_2CH_2N$ within the PEI of about 0.5 to 1. The source of carboxylic acid was chloroacetic acid in one case and bromoacetic acid in another case. The procedure, as in Example B, was followed except for the differences noted here. Elemental Analysis Found: C, 44.72%; H, 8.35%; O, 29.3%. The polymer is referred to hereinafter as polymer C.

A partially functionalized carboxylic acid containing water-soluble polymer was prepared on polyethyleneimine (BASF, Polymin P, unpurified, 70,000 to 700,000 MW range) using a molar ratio of carboxylic acid moiety to subunits of $CH_2CH_2N$ within the PEI of about 0.5 to 1. The source of carboxylic acid was chloroacetic acid. The procedure as in example B was followed except for differences noted here. The material was diafiltered through several molecular weight cutoff membranes such that a molecular weight fraction of greater than 10,000 MWCO but less than 30,000 MWCO and a molecular weight fraction greater than 30,000 MWCO but less than 100,000 MWCO (referred to hereinafter as polymer Ca) and a fraction greater than 100,000 MWCO (referred to hereinafter as polymer Cb) were obtained.

EXAMPLE D (polymer D)

A fully functionalized phosphonic acid containing water-soluble polymer of the structure:

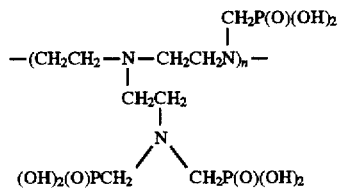

was prepared on a polyethyleneimine (Polymin Waterfree from BASF, used as received, i.e., unpurified). Polyethyleneimine (2.50 g, about 0.058 mole monomer equivalent) was dissolved in 6M hydrochloric acid (80 mL) followed by the addition of solid phosphorous acid (19.0 g, 0.29 mole) at room temperature. The homogeneous solution was brought to reflux followed by the dropwise addition of formaldehyde (38 mL of a 37% solution, 0.47 mole) over a hour. After the addition was complete, the solution was stirred at reflux for an additional hour. The heat was removed and the flask allowed to sit overnight at room temperature. The sticky solid precipitate was collected by decantation of the liquid from the flask. The solid was dissolved in water and adjusted to pH 6.8 with sodium hydroxide. The solution was purified by diafiltration through a 30,000 MWCO membrane. A total permeate volume of 3.5 liters was collected. The solution was then concentrated to approximately 150 mL. After removing the water under reduced pressure, the residue (referred to hereinafter as polymer D) was dried under high vacuum at 60° C. overnight to give 6.3 g of a light yellow solid. Elemental analysis found: C, 22.46%; H, 5.48%; N, 8.70%; P, 16.88%.

EXAMPLE E (polymer E)

A partially functionalized phosphonic acid containing water-soluble polymer of the structure:

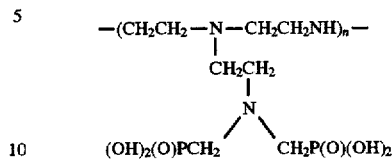

was prepared on a polyethyleneimine. Polyethyleneimine (BASF Polymin -Waterfree, 10,000–25,000 MW and pre-purified by diafiltration through a 30,000 MWCO cartridge prior to use as in example A, 25.0 g, 0.58 mole monomer equivalent) was dissolved in 6M hydrochloric acid (300 mL) followed by the addition of solid phosphorous acid (47.56 g, 0.58 mole) at room temperature. The homogeneous solution was brought to reflux followed by the dropwise addition of formaldehyde (23.53 mL of a 37% solution, 0.29 mole) over a hour. After the addition was complete, the solution was stirred at reflux for an additional hour. The heat was removed and the flask allowed to sit overnight at room temperature. The reaction mixture was diluted with water to 2 liters and the pH adjusted to 6.8 using potassium hydroxide. The solution was purified by diafiltration through a 30,000 MWCO. A total permeate volume of 6 liters was collected. The solution was then concentrated to approximately 200 mL. After removing the water under reduced pressure, the residue (referred to hereinafter as polymer E) was dried under high vacuum at 60° C. overnight to give 32 g of a light yellow solid. Elemental analysis: %C, 30.18; %H, 8.42; %N, 13.95; %P, 14.05; %K, 0.15.

A partially functionalized phosphonic acid containing water-soluble polymer was prepared on polyethyleneimine (BASE, Polymin P, unpurified, 70,000 to 700,000 MW range) using a molar ratio of phosphonic acid moiety to subunits of $CH_2CH_2N$ within the PEI of about 0.5 to 1. The procedure as in example E above was followed except for differences noted here. The material was diafiltered through several molecular weight cutoff membranes such that a molecular weight fraction of greater than 10,000 MWCO but less than 30,000 MWCO and a molecular weight fraction greater than 30,000 MWCO but less than 100,000 MWCO (referred to hereinafter as polymer Ea) and a fraction greater than 100,000 MWCO (referred to hereinafter as polymer Eb) were obtained.

EXAMPLE F (polymer F)

An acylrnethylpyrazolone containing water-soluble polymer of the structure:

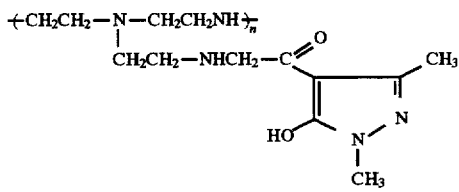

was prepared on a polyethyleneimine as follows: A precursor (4-chloroacetyl-1,3-dimethyl-pyrazol-5-one) was first prepared. To a 500 mL three-neck round bottom flask fitted with a reflux condenser, mechanical stirrer, and a pressure equalizing additional funnel, 1,3-dimethylpyrazol-5-one (6.03 g, 53.84 mmole) and dioxane (55 mL, distilled from sodium metal) were added. The mixture was heated to 40°–50° C. to dissolve the suspended solids and give a light yellow solution. The reaction mixture was cooled to 30°–35° C. followed by the addition of Ca(OH)$_2$ (7.98 g, 107.68 mmole). After 10 minutes of stirring, chloroacetyl chloride (6.82 g, 59.22 mmole) in dioxane (20 mL) was added over a period of 30 minutes. The reaction mixture was heated at reflux for 24 hours. The reaction mixture was filtered while hot and the filter cake washed with hot dioxane (2×20 mL) followed by methanol (2×20 mL). The solvent was removed under reduced pressure yielding 14 g of the product as the calcium salt. The solid was passed through a column of Dowex-50W strongly acid cation exchange resin. Water was removed under reduced pressure leaving a white solid which was further dried under vacuum at 60° C. over night to give the product (61%, m.p.–161°–165° C.) as a white solid in 61% yield. $^1$H NMR (CDCl$_3$, ppm) δ4.38 (s), 3.60 (s), 2.41 (s). $^{13}$C NMR (CDCl$_3$, ppm) 15.6, 32.7, 45.7, 101.0, 146.0, 159.3, 188.2.

The polymer was then prepared as follows: PEI polymer (Polymin Waterfree 4.00 g, prefiltered through a 30,000 MWCO cartridge as in example A, was dissolved in water (100 mL) and brought to reflux. The 4-chloroacetyl-1,3-dimethyl-pyrazole-5-one precursor from above (4.40 g, 23.33 mmol) and triethylamine (4.68 g, 46.25 mmol) dissolved in water (20 mL) were added dropwise over a 10 minute period. The solution was stirred at reflux for 2.5 hours at which time it turned from yellow to orange and then to red. After cooling to room temperature, the material was diluted with deionized water to a volume of 1 liter and the polymer purified by diafiltration through a 30,000 MWCO cartridge collecting 5 liters of permeate. The water was removed under reduced pressure and the residue (referred to hereinafter as polymer F) was dried under vacuum at 60° C. to give a reddish-orange, brittle solid (5.49 g, 73%). IR (ATR): 3435 (N-H), 1626 (C=O) cm$^{-1}$. Elemental Analysis: C, 53.85%; H, 8.65%; N, 24.59%; O, 12.98%.

EXAMPLE G (polymer G)

An acylphenylpyrazolone containing water-soluble polymer of the structure:

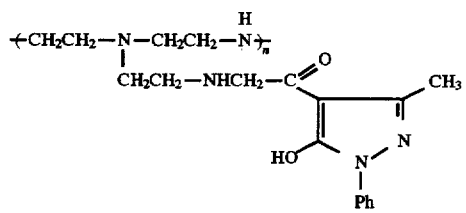

was prepared on a polyethyleneimine as follows. PEI (1.00 g, polymin waterfree, unpurified) and triethylamine (2.34 g, 23.1 mmol) were dissolved in chloroform (30 mL) and brought to reflux. The 1-phenyl-3-methyl-4-chloroacetyl-pyrazole-5-one, prepared following the procedures of Jensen in ACTA Chem. Scand., 1959, 13, 1668 and Okafor et al. in Synth. React. Inorg. Met. Org. Chem., 1991, 21(5), 826, (3.18 g, 5.8 mmol), in chloroform (10 mL) was added dropwise to the solution resulting in the precipitation of a tan solid. After stirring for 1.5 hours, the mixture was cooled and the suspended solid collected by filtration. The solid was dissolved in water (400 mL), adjusted to a pH of 3.0, and the solution diafiltered using a 30,000 MWCO cartridge. The water was removed under reduced pressure and the residue (referred to hereinafter as polymer G) dried in a vacuum oven at 60° C. to give 1.56 g as a red brittle solid. IR (ATR): 3430 (N-H), 1630 (C=O) cm$^{-1}$.

EXAMPLE H (polymer H)

A hydroxamic acid containing water-soluble polymer of the structure:

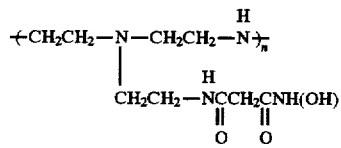

was prepared on polyethyleneimine (PEI). Hydroxylamine hydrochloride (2.78 g, 39.97 mmol) was dissolved in methanol (15 mL). Potassium hydroxide (2.24 g, 39.97 mmol), dissolved in methanol (10 mL), was added dropwise to the hydroxylamine solution. The mixture was stirred for 1 hour after which the precipitated potassium chloride was collected by filtration. To the filtrate was added solid succinic anhydride (4.00 g, 39.90 mmol). The mixture was stirred at room temperature for 3 hours. The solvent was removed under reduced pressure leaving a white sticky solid. The solid was allowed to sit under anhydrous diethyl ether for one hour. The solid was collected by filtration giving 4.80 g of the monohydroxamic acid of succinic acid as a white solid with a melting point of from 72°–82°.

This solid (1.00 g, 7.51 mmol), dicyclohexylcarbodiimide (DCC) (1.54 g, 7.51 mmol) and a catalytic amount of 4-(dimethylamino)pyridine were dissolved in tetrahydrofuran (THF) (10 mL). After stirring for 24 hours at room temperature, the solution was filtered to remove the DCU (dicyclohexylurea) byproduct. This THF solution was added to a methanolic solution containing polyethyleneimine (1.29 g, 29.95 mmol monomer eq., prepurified as in Example A, >30,000 MWCO), a small amount of phenolphthalein, and enough sodium methoxide to make the solution pink. The solution was stirred for 5 hours. The solvent was evaporated and the product purified by dissolving in water and diafiltered through a 30,000 MWCO hollow-fiber membrane. Evaporation of the water followed by drying under vacuum at 60° C. gave 1.21 g of a white polymer (referred to hereinafter as polymer H). Testing with the iron chloride test gave a dark red color indicating a positive test for the presence of hydroxamic acid.

EXAMPLE I (polymer I)

A hydroxamic acid containing water-soluble polymer of the structure:

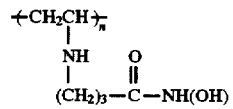

was prepared from the ring opening of polyvinylpyrrolidone with hydroxamic acid to give polyvinylamine-N(pentanoic hydroxamic acid) (PVA-PHA). Polyvinylpyrrolidone (1.0 g, MW 40,000, Aldrich), sodium hydroxide (40 mL of 1.0M), and hydroxylamine hydrochloride (2.71 g) were mixed together and heated to 90° C. A pH 12 was maintained by small additions of sodium hydroxide if necessary. The solution was heated for two days, cooled and dialyzed through a 20,000 MWCO membrane. Water was removed from the polymer solution under vacuum to give a clear solid material upon drying in an oven at 60° C. (referred to hereinafter as polymer I) which gave a positive ferric chloride test for hydroxamic acid (hydroxylamine does not give a positive ferric chloride test).

EXAMPLE J (polymer J)

A ester functionalized water-soluble polymer of the structure:

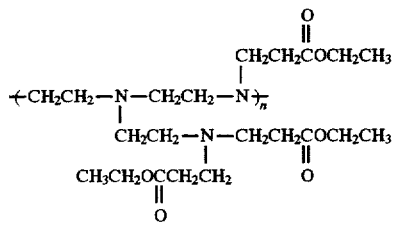

was prepared as follows: Polyethyleneimine (1.00 g, purified as in Example A, >30,000 MWCO) was dissolved in ethyl acrylate (9.21 g, 92 mmol)) and the solution stirred at reflux for 3 hours. The excess ethyl acrylate was removed under vacuum keeping the temperature below 70° C. to avoid its' polymerization. The viscous polymeric material was used in the next step without further purification (referred to hereinafter as polymer J).

EXAMPLE K (polymer K)

A hydroxamic acid functionalized water-soluble polymer of the structure:

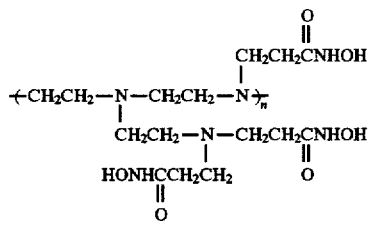

was prepared as follows. The polymer from Example J was treated with potassium hydroxide (15.46 g, 0.28 moles) followed by a solution of hydroxylamine hydrochloride (12.79 g, 0.18 moles) in methanol (100 mL) maintaining a temperature below 20° C. The mixture was stirred for 1 hour then filtered. The filtrate was added to the crude PEI/ethyl acrylate adduct and stirred at room temperature for 14 hours. The methanol was removed under reduced pressure and the residue dissolved in water (50 mL). The polymer was purified by diafiltration using a stirred cell with a 30,000 MWCO polysulfone membrane. After the collection of 6 volume equivalents (300 mL) of permeate, the water was removed from the retentate under reduced pressure and the material dried in a vacuum oven at 60° C. overnight to give 92.22 g of the polymer (referred to hereinafter as polymer K) as a light tan brittle solid which was very hygroscopic. IR (ATR): 1732 (C=O) cm$^{-1}$.

EXAMPLE L (polymer L)

An aza crown ether containing water-soluble polymer of the structure:

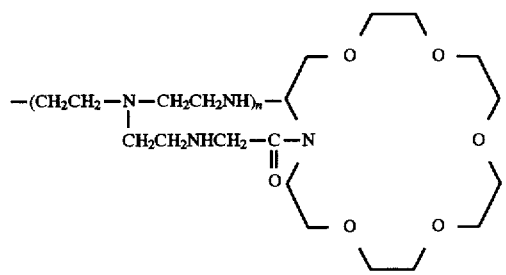

was prepared on a polyethyleneimine as follows: N-Chloroacetyl-aza-18-crown-6 (0.56 g, 1.65 mmol), polyethyleneimine (0.29 g, prepurified as in example A, >30,000 MWCO) and potassium carbonate were combined in acetonitrile and stirred at reflux for 16 hours. After cooling to room temperature, the solvent was removed under reduced pressure leaving a brown oil. The residue was dissolved in water and the polymer purified by diafiltration. Evaporation of the water followed by drying under vacuum at 60° C. gave 0.81 g of a tan solid (referred to hereinafter as polymer L) characterized by IR, $^1$H and $^{13}$C NMR.

EXAMPLE M (polymer M)

An all oxygen containing crown ether water-soluble polymer of the structure:

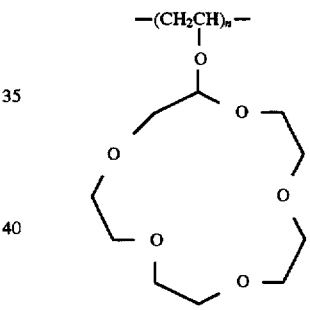

composed of 15-crown-5 ether on polyvinylalcohol was prepared. 247 mg (4.94 mmole) of the polyvinylalcohol (88% hydrolyzed) in 10 mL of dried DMF was warmed to 50°–60° C. to dissolve. The clear solution was than cooled to room temperature and 341 mg (2.47 mmole) of K$_2$CO$_3$ was added. The mixture was stirred for 30 min. Then, 0.67 g (0.33 mmole) of the 15-crown-5 in 2 mL of dried dimethylformamide was added to the reaction mixture. The colorless mixture turned to green-blue in 45 minutes and became light yellow in 2 hours. The yellow mixture was allowed to stir at 50°–60° C. for overnight. The reaction was quenched in water, the suspension was filtered and the polyvinylalcohol-crown ether was purified by ultrafiltration with a 30,000 MWCO cartridge and yielded 150 mg of polymer (referred to hereinafter as polymer M) and characterized by IR, $^1$H and $^{13}$C NMR.

EXAMPLE N (polymer N)

A permethylated poly(vinylamine) water-soluble polymer of the structure:

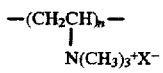

was prepared as follows: Poly(vinylamine) (10.0 g) was dissolved in 50 mL of methanol and transferred to a four-neck round bottomed flask containing an additional 50 mL of methanol. Phenolphthalein (10.0 mg) was added resulting in a light pink solution. Sodium methoxide (38.85 g, 0.72 mole) suspended in 450 mL of methanol and dimethylsulfate (90.69 g, 0.72 mole) dissolved in 100 mL of methanol were added simultaneously by separate pressure equalizing addition funnels at such a rate as to maintain a light pink color. The addition process was conducted under a nitrogen atmosphere at room temperature. It was necessary to add additional sodium methoxide (3.0 g in 50 mL of methanol) to maintain the pink color throughout the dimethylsulfate addition. The total addition time was about 1.5 hours.

After the completed addition, the solution was brought to reflux and stirred for about 1.5 hours. After cooling to room temperature, the solution was transferred to a single neck flask and the solvent removed under reduced pressure leaving a dark yellow material. The material was re-dissolved in 450 mL of deionized water and the solution diafiltered using a 30,000 MWCO hollow-fiber cartridge. Five volume equivalents or about 2.5 L of permeate was collected. For anion exchange from sulfate to chloride, 50 g of sodium chloride in 150 mL of water was added and the solution allowed to stand overnight. The solution was then diafiltered with 3 L of deionized water. The water from the retentate was removed under reduced pressure and the residue (referred to hereinafter as polymer N) dried under vacuum at 60° C. overnight to yield 19.58 g (69%) of an orange-brown crystalline solid. IR (KBr): 3437 (N-H), 2928, 1629 (C=O), 1481 cm$^{-1}$. Elemental Analysis: C, 48.25%; H, 10.68%; N, 10.92%; Cl, 15.87%; S, <0.97%.

EXAMPLE O (polymer O)

A permethylated polyallylamine of the structure:

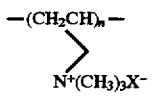

was prepared. Polyallylamine (10.0 g, Aldrich) was dissolved in 100 mL of methanol and transferred to a four-neck round bottomed flask containing an additional 50 mL of methanol. Phenolphthalein (14.0 mg) was added to the solution. Sodium methoxide (23.70 g, 0.44 mole) suspended in 400 mL of methanol and dimethylsulfate (42.0 g, 0.33 mole) dissolved in 70 mL of methanol were added simultaneously by separate pressure equalizing addition funnels at such a rate as to maintain a light pink color. The addition process was conducted under a nitrogen atmosphere at room temperature. It was necessary to add additional sodium methoxide (3.0 g in 50 mL of methanol) to maintain the pink color throughout the dimethylsulfate addition. The total addition time was about 30 minutes.

After the completed addition, the solution was brought to reflux and stirred for about 1.5 hours. After cooling to room temperature, the solution was transferred to a single neck flask and the solvent removed under reduced pressure leaving an opaque pink material. The material was re-dissolved in 500 mL of deionized water and the solution diafiltered using a 30,000 MWCO hollow-fiber cartridge. Five volume equivalents or about 2.5 L of permeate was collected. For anion exchange of sulfate for chloride, 50 g of sodium chloride in 150 mL of water was added and the solution allowed to stand overnight. The solution was then diafiltered with 2.6 L of deionized water. The water from the retentate was removed under reduced pressure and the residue dried under vacuum at 60° C. overnight to yield 10.18 g (70%) of a light yellow crystalline solid (referred to hereinafter as polymer O). IR (KBr): 3437, 2929, 1686, 1485, 1251 cm$^{-1}$. Elemental Analysis: C, 47.85%; H, 10.62%; N, 10.62%; Cl, 11.78%; S, 1.13%.

EXAMPLE P (polymer P)

A guanidinium-containing PEI polymer of the following structure:

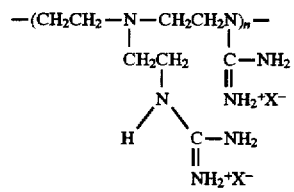

was prepared as follows( where X- is sulfate): Polyethyleneimine (as prepurified in example A, >30,000 MWCO, 5.0 g, 116 mmole amine) and 0-methylisourea-hemisulfate (Jansen, 14.35 g, 116 mmol) were placed in a 125 mL flask and dissolved in 12 mL water with shaking. The solution was allowed to stand for 2 days, and was then placed in dialysis tubing (Spectra Por, 15,000 MWCO). The tubing with the reaction mixture was placed in a 1 L jar containing deionized water, and the water was changed 5 times. The contents of the dialysis tubing was concentrated to a white foam by rotary evaporation, and then dried to a colorless glassy foam (referred to hereinafter as polymer P) under vacuum at 60° C. overnight. Yield: 5.04 g. Elemental Analysis: C 33.88%, H 7.70%, N 26.69%, S 9.63%;

EXAMPLE Q (polymer Q)

A permethylated PEI polymer of the structure:

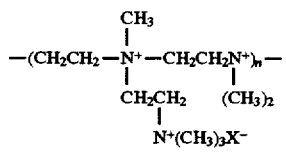

was prepared. Purified PEI (20.0 g as prepared as in example A, >30,000 MWCO) was dissolved in 200 mL of methanol and placed in a round bottom flask outfitted with a condenser under argon. Dimethyl sulfate (120 g, 0.95 moles, Eastman) dissolved in 110 mL methanol was added slowly from an addition funnel. After addition (about 3 hours) the reaction was brought to reflux while potassium carbonate (64.2 g, 0.046 moles, Janssen) was added slowly from a solids addition funnel (care should be taken to do a slow addition to prevent excess foaming). The solution was cooled, filtered, and the methanol removed under vacuum. The solid filter cake was dissolved in 600 mL of water and combined with the residue from the filtrate. The combined solution was purified by dialfiltration (30,000 MWCO) using water. The sulfate anion was exchanged for chloride by adding 120 gm sodium chloride in 400 mL water and then stirring for 48 hours. The solution was concentrated and further diafiltered (30,000 MWCO) with water to 5 L volume changes. The final solution was concentrated by ultrafiltration to 500 mL and then further concentrated and dried under vacuum to give a 21.6 g of an off-white glassy polymer (referred to hereinafter as polymer Q). Elemental Analysis before chloride exchange: C 34.15%, H 8.07%, N 8.96%, S 15.56%. Potentiometric titration of the polymer gave a sharp strong-acid-base type titration curve indicating that all the amine sites were methylated. (If the curve was not sharp, it would indicate that methylation was incomplete).

EXAMPLE R (polymer R)

An amide containing water-soluble polymer of the structure:

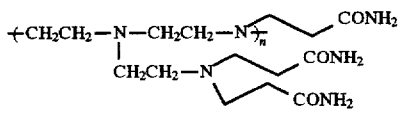

was prepared as follows: Polyethyleneimine (2.00 g, prepared as in Example A, >30,000 MWCO) was dissolved in methanol (20 ml) and brought to reflux. Acrylamide (4.95 g, 70 mmol) and butylated hydroxytoluene (BHT, 200 ppm in solution) was dissolved in methanol (20 ml) and added dropwise to the reaction flask over a 15 minute period. The solution was stirred at reflux for 24 hours. After cooling to room temperature, deionized water (400 ml) was added and the polymer purified by diafiltration using a 30,000 MWCO cartridge. The water was removed under reduced pressure and the polymer dried in a vacuum oven at 60° C. to yield 4.5 g of a clear glassy solid (referred to hereinafter as polymer R) and characterized by IR, $^1$H and $^{13}$C NMR.

EXAMPLE S (polymer S)

A permethylated polyvinylpyridine of the structure:

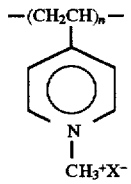

was prepared as follows: To a solution of polyvinylpyridine (3 g as a 25% solution in methanol, Reilly Industries) was added dropwise iodomethane (4.85 g, 0.03 mole) in 2 mL of methanol at room temperature. After addition was complete, the solution was stirred for about 2 hours giving a light green color. An additional amount of iodomethane (2 g) was added and allowed to stir for about 2 hours. Deionized water (200 mL) was added to the reaction mixture and the solution diafiltered with 1 L of permeate collected through a 30,000 MWCO membrane. The water from the retentate was removed under reduced pressure and the residue dried under vacuum at 60° C. overnight to yield 4.82 g (68%) of a yellowish green crystalline solid (referred to hereinafter as polymer S). IR (KBr): 3437 (N-H), 3028, 2930, 1640 (C=O), 1156 cm$^{-1}$. Elemental Analysis: C 40.74%, H 4.43%, N 6.22%, I 36.93%.

The iodide salt of polymer S was converted to the chloride salt by stirring the polymer overnight with sodium chloride (referred to hereinafter as polymer Sa). Elemental Analysis: C 52.65%, H 7.07%, N 8.27%, Cl 12.74%.

EXAMPLE T (polymer T)

A partially functionalized carboxylic acid containing water-soluble polymer of the following structure:

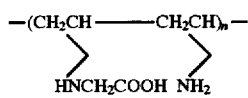

was prepared on polyallylamine. A solution of sodium hydroxide (2.139 g) in water (50 mL) was added dropwise over a period of 43 minutes to a solution of polyallylamine (5.0 g, Aldrich) and chloroacetic acid (2.53 g) in water (60 mL) keeping the temperature below 50° C. After the addition was complete, the solution was stirred at reflux for 3 hours. The solution was cooled to room temperature. The polymer was purified by diafiltration collecting five volume equivalents of permeate using hollow-fiber cartridges with a 30,000 MWCO. The bulk of the water was removed from the retentate under reduced pressure. The residual material was dried in a vacuum oven at 60° C. overnight to give 4.2 g of a light tan solid (referred to hereinafter as polymer T). UV/VIS: lambda max=296 nm. IR(ATR): 1638 cm$^{-1}$ (C=O).

EXAMPLE U (polymer U)

A partially functionalized carboxylic acid containing water-soluble polymer of the following structure:

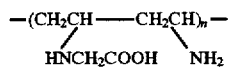

was prepared on polyvinylamine. A solution of sodium hydroxide (9.29 g) in water (160 mL) was added dropwise over a period of 35 minutes to a solution of polyvinylamine (10.0 g) and chloroacetic acid (10.97 g) in water (240 mL) keeping the temperature below 50° C. After the addition was complete, the solution was stirred at reflux for 3 hours. The solution was cooled to room temperature. The pH of the solution was 11.8 and adjusted using sodium hydroxide or hydrochloric acid. The solution started to precipitate between pH 7 and 8.5. The polymer was purified by diafiltration and rinsed with deionized water and adjusted to pH 11.3. Five volume equivalents of permeate was collected using hollow-fiber cartridges with a 30,000 MWCO. The bulk of the water was removed under reduced pressure. The residual material was dried in a vacuum oven at 60° C. overnight to give 12.42 g of a light tan brittle solid (referred to hereinafter as polymer U). UV/VIS: lambda max=294 nm. IR (ATR): 1603 cm$^{-1}$ (C=O).

EXAMPLE V (polymer V)

A water-soluble copolymer containing betadiphosphonic ester and amide groups of the following structure:

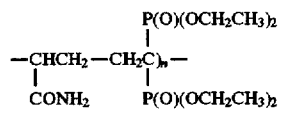

was prepared by copolymerization. Acrylamide (664 mg, 9.35 mmole), tetraethyl-ethenyldienebis(phosphonate) (500 mg, 1.67 mmole), and ammonium persulfate (21 mg, 1%) as a polymerization initiator were dissolved in 20 mL of deionized water. The mixture was stirred vigorously at 65°–70° C. for 48 hours and the solution remained clear throughout. The reaction was cooled to room temperature and diluted with deionized water to 250 mL. The polymer was purified by diafiltration using a 30,000 MWCO cartridge and collected 5 volume equivalents of permeate. The retentate was concentrated and dried in a vacuum oven at 60° C. A colorless polymer was obtained (250 mg) (referred to hereinafter as polymer V). Characterized by IR, NMR, $^{31}$P NMR (PPM) 26.02, 27.42.

EXAMPLE W (polymer W)

A water-soluble copolymer containing betadiphosphonic acid ester and amide groups of the following structure:

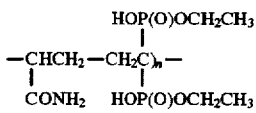

was prepared by copolymerization. Polymer V prepared as above (87 mg) was dissolved in 10 mL of deionized water. Excess NaOH (24 mg) was added. The clear solution was stirred at room temperature overnight. The reaction was quenched by diluting with water to 200 mL, and purified by diafiltration using a 30,000 MWCO membrane. The concentrate was dried under a vacuum at 60° C. to give 80 mg of light brown solid (referred to hereinafter as polymer W). The polymer was characterized by IR, NMR, $^{31}$P NMR (PPM) 27.2.

EXAMPLE X (polymer X)

A water-soluble copolymer containing betadiphosphonic diacid and amide groups of the following structure:

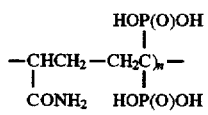

was prepared by copolymerization. The vinyl bisphosphonate (5.07 g, 16.9 mmole) was dissolved in trimethylbromosilane (20.7 g, 135.2 mmole) under argon. The reaction mixture was stirred at room temperature overnight. Excess trimethylbromosilane and other volatiles were removed under reduced pressure and the residual oil treated with 95% EtOH (15 mL). The mixture was stirred overnight at room temperature. Volatile materials were remover again under reduced pressure to give 3.0 g (90% yield) of pure vinyl bisphosphonic acid. Acrylamide (1.08 g mg, 15.22 mmole), vinylbisphosphonic acid (500 mg, 2.72 mmole), and ammonium persulfate (34 mg, 1%) as a polymerization initiator were dissolved in 20 mL of deionized water. The mixture was stirred vigorously at 50°–55° C. for 40 hours and the solution remained clear throughout. The reaction was cooled to room temperature and diluted with deionized water to 50 mL. The polymer was purified by diafiltration using a 30,000 MWCO cartridge and collected 5 volume equivalents of permeate. The retentate was concentrated and dried in a vacuum oven at 60° C. A colorless polymer was obtained (700 mg) (referred to hereinafter as polymer X). Characterized by IR, NMR, $^{31}$P NMR (PPM).

EXAMPLE Y (polymer Y)

A partially functionalized mercaptosuccinic acid containing water-soluble polymer of the following structure:

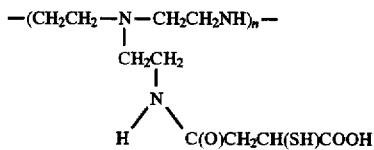

was prepared on polyethyleneimine. In a typical synthesis, 10.00 g (233 milliequivalents of PEI, prepurified as in example A, >30,000 MWCO) was dissolved in 200 mL water and the solution purged with argon for twenty minutes. Solid Sacetylmercaptosuccinic anhydride, 10.00 g (57.5 mmole), was added with stirring. After the solid disappeared, 10 g (94 mmole) of sodium carbonate was slowly added with care taken to ensure that the vigorous evolution of gas and resultant foaming did not cause an overflow. The solution was stirred overnight and then acidified to pH 4 with concentrated nitric acid. After purging with argon for twenty minutes, the solution was brought to pH 7 with sodium hydroxide. The slightly cloudy mixture was filtered through a fine, glass frit. The product was purified by diafiltration with at least five times as much millipore water as the final solution volume. Lyophilization of the retentate yielded the product (referred to hereinafter as polymer Y). Characterization: $^1$H and $^{13}$C NMR and IR.

Elemental analysis of 3 different batches batch (1) C 42.57, H 7.19, N 12.85, S 9.17, S* 10.5
batch (2) C 42.78, H 7.09, N 12.38, S 10.16, S* 8.4
batch (3) C 41.72, H 7.68, N 12.03, S 9.35, S* 8.2

S* Thiol sulfur content when analyzed by iodometric titration.

EXAMPLE Z (polymer Z)

A partially functionalized ethyl thiol containing water-soluble polymer of the following structure:

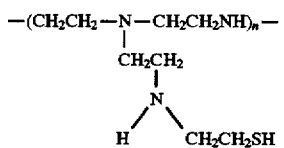

was prepared on polyethyleneimine. In a typical synthesis, 10.00 g (233 milliequivalents of PEI prepared as in Example A, 30,000 MWCO) was dissolved in 200 ml water and the pH was adjusted to 7 with concentrated HNO$_3$. The solution was purged with argon for twenty minutes and 3.45 mL (57.5 mmole) of ethylene sulfide was added with stirring. The biphasic mixture was stirred overnight and the slightly cloudy mixture was filtered through a fine, glass frit. The product was purified by diafiltration with at least five times as much millipore water as the final solution volume. Lyophilization of the retentate yielded 13.5 g of the product as a white powder (referred to hereinafter as polymer Z). Characterization: $^1$H and $^{13}$C NMR and IR.

EXAMPLE AA (polymer AA)

A partially functionalized N-methylthiourea containing water-soluble polymer of the following structure:

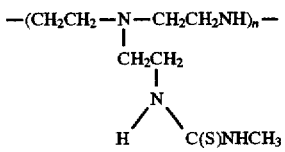

was prepared on polyethyleneimine. In a typical synthesis, 11.20 g (260 milliequivalents of PEI, prepared as in Example A, >30,000 MWCO) was dissolved in 200 ml of ethanol and the solution was purged with argon for twenty minutes. Methylisothiocyanate was warmed to 35° C. and 4.75 g (65.1 mmole) was mixed with 10 mL of ethanol. The isothiocyanate solution was added to the PEI at 0° C. and the solution was stirred one hour at which time a gooey precipitate formed. The solvent was removed via rotary evaporation and the product redissolved in 100 mL of water to which 5.86 mL of concentrated $HNO_3$ was added. After stirring overnight, the slightly cloudy mixture was filtered through a glass frit and the product was purified by diafiltration with at least five times as much millipore water as the final solution volume. Lyophilization of the retentate yielded 13.8 g of the product as a white powder (referred to hereinafter as polymer AA). Characterization-$^1$H and $^{13}$C NMR and IR.

EXAMPLE BB (Polymer BB)

A phosphonic acid on a polyvinylamine backbone with the following structure:

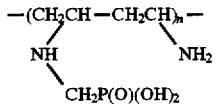

was prepared. A solution of formaldehyde (9.42 mL) was added dropwise during reflux over a period of 22 minutes to a solution of polyvinylamine (10 g) and phosphorus acid (19.04 g), in 3N HCl. After the addition was complete the solution was stirred at reflux for an additional hour. The heat was removed and cooled to room temperature. The solution was titrated to pH 6.8 with NaOH. The polymer was purified by diafiltration collecting five volume equivalents of permeate using a hollow-fiber cartridge with a 30,000 MWCO. The bulk of the water was removed under reduced pressure. The residual material was dried in a vacuum oven at 60° C. overnight to give 18.21 g of a brittle yellow-orange solid (referred to hereinafter as polymer BB). UV/VIS: lambda max=296 nm. IR(ATR): 1628 cm$^{-1}$ (C=O).

EXAMPLE 1

Binding Studies of the phosphonic acid containing water-soluble polymer of example D (polymer D) at varying pH and nitrate concentration was conducted as follows. These studies used polymer D with Amicon Centricon-10 (C-10) microconcentrators having a 10,000 MWCO. A stock solution of polymer D (0.1 wt/vol %) was prepared with Millipore™ water then prefiltered (Nalgene, 0.2μ). Various concentrations of polymer D (0.001%, 0.01%, 0.05%, 0.1%, 0.6 wt/vol %) and $NaNO_3$ (0.1M, 4.0M) were used at pH ranges of 1 through 6. The working solutions were spiked with $^{241}$Am or $^{238}$Pu and titrated with aqueous NaOH and dilute $HNO_3$ to the desired pH values. The solutions were mixed for various times from two hours to overnight. The C-10 unit is comprised of two halves, a retentate (top) and permeate (bottom) portion, with the Membrane filter attached to the retentate half. Initial weights of the retentate and permeate units were taken. Two milliliter samples were placed in the retentate half of the C-10 unit and centrifuged at 2200 rpm for 25 minutes until one milliliter remained as the retentate and one milliliter as the permeate. Final weights were recorded for each unit. The ultrafiltration units were then placed in separate liquid scintillation vials with 13 mL of Ultima Flo AF (from Packard) and analyzed on an alpha counter (Beckman Instruments). Measuring the complete units the two halves) with the sample gives 100% accountability as no samples were transferred, thus, no activity losses from adhesion to the sides of the apparatus. The adsorption or binding capacity of the polymer for metal ions is expressed as the distribution coefficient ($K_d$) which is defined as: [total bound actinide/total free actinide]×[phase ratio]. The phase ratio is the sample volume/grams of polymer being used in the sample. The percent bound material is: [total bound metal count]/[total count]×100%. The results are reported in Table 1. It can be seen that both Pu(III)/(IV) and Am(III) bind well over the pH range 3 to 6 with Pu having the higher overall $K_d$ values. One of the most interesting results from this study is that the $K_d$ values are overall higher at the higher nitrate concentration.

TABLE 1

| | Study of Polymer D for pH and Ionic Strength for $^{241}$Am and $^{238}$Pu. | | | |
|---|---|---|---|---|
| | 0.1% wt/vol % polymer D | at 0.1 M $NO_3$ | 0.1% wt/vol % polymer D | at 4 M $NO_3$ |
| pH | Avg. Log $K_d$ of $^{241}$Am(% Ret.) | Avg. Log $K_d$ of $^{238}$Pu(% Ret.) | Avg. Log $K_d$ of $^{241}$Am(% Ret.) | Avg. Log $K_d$ of $^{238}$Pu(% Ret.) |
| 1 | 2.07(10.64%) | 3.35(68.35%) | 4.44(96.53%) | 4.61(97.60%) |
| 2 | 3.94(89.66%) | 4.70(98.03%) | 4.91(98.79%) | 4.69(98.01%) |
| 3 | 4.81(98.49%) | 4.90(98.74%) | 5.06(99.14%) | 5.30(99.48%) |
| 4 | 4.81(98.49%) | 5.48(99.80%) | 4.81(98.48%) | 4.78(98.37%) |
| 5 | 4.85(98.58%) | 5.44(99.63%) | 4.84(98.54%) | 4.83(98.54%) |
| 6 | 4.91(98.69%) | 6.44(99.97%) | 5.12(99.25%) | 5.13(99.24%) |

EXAMPLE 2

Metal ion competition studies with iron(III) were conducted as follows. Since iron is prevalent in the environment, competition studies against iron were performed. Working solutions containing various concentrations of $Fe(NO_3)_3$ (100 ppm, 500 ppm, 1000 ppm, 1500 ppm, 2000 ppm, and 2500 ppm) with 0.1 wt %/vol % polymer D and 1.0M $NaNO_3$ at pH 4 were prepared spiked with $^{241}$Am. Using the same centricon units and procedures as in Example 1, the results reported in Table 2 were obtained. The competition with $Fe(NO_3)_3$ for binding sites on the polymer indicated that 1500 ppm Fe definite decrease in the average $K_d$ was observed.

TABLE 2

| Competition study using 0.1 wt/vol % polymer D with $Fe(NO_3)_3$ in 1.0 M $NaNO_3$ | | |
|---|---|---|
| ppm $Fe(NO_3)_3$ | Log $K_d$Am | % Bound |
| 0 | 4.79 | 98.21 |
| 100 | 4.78 | 98.35 |
| 500 | 4.76 | 98.28 |
| 1000 | 5.11 | 99.23 |
| 1500 | 3.31 | 66.90 |
| 2000 | 2.28 | 16.42 |
| 2500 | 2.51 | 24.81 |
| 3000 | 2.49 | 23.86 |

EXAMPLE 3

Comparison study of two chelating polymers, polymer D and polymer E, were performed, at 0.1 wt/vol % by weight polymer concentration and NaNO$_3$ (0.1M and 4.0M) at pH range of 2 to 4. The working solutions were spiked with $^{241}$Am, titrated to the appropriate pH, and mixed for 30 minutes. Two mL of the resulting solutions were centrifuged using the Centricon-10 unit until one mL passed the membrane. The top (retentate) and bottom (permeate) portions were placed in separate liquid scintillation vials with Ultama Flo, shaken, and counted. The K$_d$ values were calculated and are reported in Table 3. Results from the comparison of polymer E to polymer D indicated that there was very little difference in the two polymer's ability to retain the actinide metals Pu and Am. The major difference is that there was no precipitation observed down to a pH value as low as 1 for polymer E whereas polymer D precipitated at pH 2. Comparison of the two polymers at 0.1M and 4.0M NaNO$_3$ indicated a slight increase in the log K$_d$ values for polymer E at both high and low ionic strength relative to polymer D in most cases.

TABLE 3

Log K$_d$ comparison of 0.1 wt/vol % polymer D and 0.1 wt/vol % polymer E at 0.1 M and 4.0 M NaNO$_3$ at pH 2, 3, and 4 for $^{241}$Am retention.

| μ = 0.1 M NaNO$_3$ | | | μ = 4.0 M NaNO$_3$ | | |
|---|---|---|---|---|---|
| pH | polymer E | polymer D | pH | polymer E | polymer D |
| 2 | 3.45 | 4.32 | 2 | 4.36 | 4.59 |
| 3 | 4.79 | 4.70 | 3 | 4.99 | 4.56 |
| 4 | 4.82 | 4.78 | 4 | 4.74 | 4.54 |

EXAMPLE 4

Simulated urine used for this example was purchased from Carolina Biological Supply Company, although the exact composition was proprietary. Simulated urine can also be produced from several sources (Free and Free, 1978; Attman and Dittmer, 1968; Long, 1961; Doresmus et. al., 1978; Kelsay et. al., 1979; Burns and Finlayson, 1980; Lentner, 1981). The simulated urine can also be prepared according to Table C above.

Actinide concentration by ultrafiltration from simulated urine was conducted as follows: Simulated urine solutions were prepared containing 0.05% and 0.1% wt/vol polymer D. Concentrated nitric acid was added in the amount of 50 g per kg of simulated urine to insure that spiked radionuclides remain in ionic form. The solutions were spiked with $^{241}$Am, pH was adjusted to 4, and then shaken for 30 minutes. Two mL samples were filtered with the C-10 units as described in Example 1. The results are shown below in Table 4. It can be seen that even in the presence of all the other materials that polymer D effectively binds and concentrates americium for recovery from urine. The polymer D was compared with a polymer (PEI with an 8-hydroxyquinoline complexant group) reported in the literature to bind actinides from aqueous solutions. This can then be used for an analytical method to analyze actinide metal ions in urine or potentially other bodily fluids.

TABLE 4

Ultrafiltration Using Simulated Urine Spiked With $^{241}$Am at pH 4.

| Polymer, wt/vol % | Total Bound (cpm) | Total Free (cpm) | % bound |
|---|---|---|---|
| 0.05% polymer D | 162835 | 4676 | 97% |
| 0.10% polymer D | 154956 | 4480 | 97% |
| 0.05% 8HQ polymer* | 56211 | 60547 | 48% |
| 0.10% 8HQ polymer* | 54803 | 29540 | 65% |

*Synthesized according to the procedure from Burckhalter et al., J. Org. Chem., vol. 26, p. 4078 (1961).

EXAMPLE 5

Actinide concentration by ultrafiltration of simulated brine waters was conducted as follows: A simulated brine solution of Table B was prepared containing 0.05 wt/vol % and 0.1 % wt/vol polymer D. The solutions were spiked with Am(III), plutonium(III/IV), uranium(VI), thorium(IV) or neptunium(IV). The pH was adjusted as necessary, and then the solutions were shaken for 30 minutes. Two mL samples were filtered with the C-10 units as described in Example 1. The two halves of the C-10 unit were placed in different scintillation vials with Ultima Flo scintillation fluid and counted. The results are shown below in Table 5.

TABLE 5

Ultrafiltration of simulated brine with 0.1 wt. vol % polymer D at pH 4.

| Actinide | Total Bound | Total free | % Bound at pH 4 |
|---|---|---|---|
| 241-Am | 6463 | 114 | 98% |
| 238-Pu | 329 | 58 | 85% |
| 232-Th | 166 | 353 | 32% |
| 238-U | 2754 | 12170 | 18% |
| 238-U | 6564 | 111 | 96% (at pH 6) |
| 239-Np | 4231 | 803 | 84% |

EXAMPLE 6

Actinide concentration by ultrafiltration of simulated actinide-containing waste waters was conducted as follows: A series of ultrafiltration experiments were performed with simulated TA-50 waste waters as shown in Table D spiked with $^{241}$Am. The ultrafiltration experiments used stirred cell apparatus (Amicon) with a 10,000 or 30,000 MWCO cellulose acetate/polypropylene backed membranes, pressurized with nitrogen to 75 psi. The spiked polymer solution was prepared with simulated waste water at 0.05 wt/vol % to 0.1% wt/vol % polymer D. A measured volume of solution was added to the cell reservoir and stirred constantly during the filtration. Equal volumes of the retentate and permeate were analyzed for $^{241}$Am by gamma counting (Packard Minaxi auto-gamma counter, Series 5000).

The permeate, retentate (if present), and membrane were analyzed for actinide content as follows: One milliliter aliquots and the folded membrane filter were placed in Roehen tubes and analyzed by the gamma counter. Liquid samples were prepared for alpha liquid scintillation counting by taking 2 mL aliquots, adding 16 mL of Optifluor liquid scintillation fluid (Packard), and shaking the solution vigorously. The membrane filter was prepared for alpha liquid scintillation counting by dissolving the membrane in 1 mL of concentrated H$_2$SO$_4$ (18%–24%, Baker) and diluting with 10 mL of distilled water to produce 10 mL sulfuric acid solutions. A 2 mL aliquot of this solution was mixed with 16 mL of Optifluor and analyzed for Am. A retention percentage was calculated as 100%×|(retentate count in 1 mL×retentate volume)+(total membrane count)]/(starting material count in 1 mL×starting volume). Accountability was determined by summing all the components (membrane, retentate and permeate) and comparing it to the starting material.

TABLE 6

Ultrafiltration using simulated waste water with 0.05 wt/vol % polymer D, the polymer spiked with $^{241}$Am at pH 4.

| Sample | Initial Volume (ml) | Initial cpm | retentate (cpm) | Permeate col(ml) | Permeate (cpm) | % Bound/ Accountability |
|---|---|---|---|---|---|---|
| 1 | 100 | 10,250 | 965,231 | 95.5 | 350 | 94.2/(97.4) |
| 2 | 109 | 169 | 17,123 | 106 | 5.5 | 93.0/(96.1) |

$^{241}$Am activity was determined by gamma counting.

The results shown in Table 6 (sample 1) indicate good americium recovery in the retentate and high accountability, demonstrating the selectivity of this chelating polymer for Am(III). The data for simulated waste waters (where exact concentrations and metal ion compositions are known) show that even at actinide metal-ion concentration of $10^{-8}$M the polymer is selective for Am over calcium, magnesium, potassium, and sodium which are present in much higher concentrations relative to Am (Table D). There is also selectivity for Am (III) over divalent transition metal ions such as copper and nickel which are present in higher concentrations than Am(III). Iron at a concentration 1000 times higher than the Am(III) indicated no interference at these tracer levels. In addition to the actinide competition with other metal ions for polymer binding sites, the polymer was competing with high concentrations of anions (phosphates and nitrates) for actinide binding.

EXAMPLE 7

A study of PEI-dimethylacetylpyrazalone (polymer F) was conducted as follows: A systematic study of PEI-DMAP to determine the optimum working concentration involved surveying polymer F binding at different polymer concentrations (0.05 wt/vol %, 0.1 wt/vol %, 0.6 wt/vol %) and ionic strengths (NaNO$_3$ at 0.1M and 4.0M) over a pH range of 2 to 12. The prepared solutions were spiked with $^{241}$Am and treated as described above in Example 1. Polymer F had good solubility properties over the whole pH range studied. There was no precipitate seen at low pH values. The polymer filtration at 0.1 wt/vol % and 0.6 wt/vol % were well behaved, the higher concentrations took much longer to filter and did not have as good binding capabilities as at 0.05 wt/wt % of the polymer. Table 7 shows the optimum conditions for this polymer are at 0.05 wt/vol % concentration and pH 7.

TABLE 7

Log K$_d$ of polymer F at 0.1 M NaNO$_3$ and varying concentrations and pH.

| pH | Log K$_d$ polymer 0.05 wt/vol % | Log K$_d$ polymer 0.1 wt/vol % | polymer 0.6 wt/vol % |
|---|---|---|---|
| 2 | 2.05 | 2.11 | 1.49 |
| 3 | 2.76 | 2.66 | 2.06 |
| 4 | 3.77 | 3.66 | 3.12 |

TABLE 7-continued

Log K$_d$ of polymer F at 0.1 M NaNO$_3$ and varying concentrations and pH.

| pH | Log K$_d$ polymer 0.05 wt/vol % | Log K$_d$ polymer 0.1 wt/vol % | polymer 0.6 wt/vol % |
|---|---|---|---|
| 5 | 4.38 | 4.23 | 3.42 |
| 6 | 4.45 | 4.37 | 3.37 |
| 7 | 4.62 | 4.32 | 3.88 |
| 8 | 4.43 | 4.41 | 3.83 |
| 9 | 4.38 | 4.31 | 3.81 |
| 10 | 4.46 | 3.92 | 3.70 |
| 11 | 4.28 | 4.17 | 3.72 |
| 12 | 4.43 | 4.31 | 3.66 |

EXAMPLE 8

A study of PEI-methylphenylacetylpyrazalone (polymer G) was conducted as follows: A survey study of polymer G to determine the range of working concentration involved surveying polymer G binding at two pH values 2 and 6. The prepared solutions were spiked with $^{241}$Am, adjusted to the appropriate pH with nitric acid, and filtered through a Harp™ (Supelco) hollow fiber having a 10,000 MWCO. Polymer G had poor solubility properties precipitating above pH 3.5. The results are summarized in Table 8.

EXAMPLE 9

A study of polyhydroxamic acid (polymer I) was as follows: A survey study of polymer I to determine the range of working concentration involved surveying polymer I binding at three pH values 2, 6, and 8. The prepared solution were spiked with $^{241}$Am, adjusted to the appropriate pH with nitric acid, and filtered through a Harp™ (Supelco) hollow fiber having a 10,000 MWCO. Polymer I had reasonable solubility over the full working range. The results are summarized in Table 8.

TABLE 8

Survey of binding properties of several water-soluble polymers for $^{241}$Am.

| Polymer | % Bound at pH 1 | % Bound at pH 6 | % Bound at pH 8 |
|---|---|---|---|
| polymer G | <2% | 83%* | — |
| 8-HQ-H** | <2% | 97% | — |
| 8-HQ-Me** | <2% | 19% | — |
| polymer B | <2% | 84% | — |
| polymer I | <2% | <2% | 99% |

*polymer was insoluble at this pH.
**Prepared according to the procedure from Bankovkis et al., Khim. Getero. Soed., vol. 11, p. 1501 (1979), and purified by dialysis ≥ 20,000 MWCO.

EXAMPLE 10

Separation of trivalent actinides (Am-241) from trivalent lanthanides (Eu-154) using polymer B in a liquid-liquid extraction system: A 0.1M solution of di-2-ethylhexylphosphoric acid (HDEHP) was prepared in diisopropylbenzene (DIPB) and pre-equilibrated with a pH 3 nitric acid solution. A solution between 0 and 2 wt/vol % of polymer B was mixed that contained lactic acid between 0 and 1.5M, an ionic strength of between 0.1 and 1.0 (nitrate, chloride, or perchlorate), a pH between 2 and 4, buffered to 0.01M with sulfanilic acid, and spiked with Eu-154 and Am-241. Equal volumes of the organic phase (2 mL) was contacted with equal volumes of the aqueous phase by shaking for 30 minutes in duplicate. The phases were disengaged by centrifugation and one mL aliquots of each phase were gamma counted using a sodium iodide detector to determine the amount of each tracer metal ion in the respective phases. Comparison experiments without polymer, at different pH values and with diethylenetriaminepentaacetic acid (DTPA) were tested. The results are shown in Table 9. It can be seen that good separation is realized with the Eu being preferentially extracted over Am in the presence of polymer B under certain conditions. Polymer B had good solubility in the regions studied. The results are comparable to using DPTA, a single ligand, but the solubility of the polymer is greatly improved over the single ligand, and the Am can be concentrated and recovered by ultrafiltration from the aqueous phase. It can be seen that the amounts of polymer, lactic acid and counter ion are important in optimizing the separation factor (SF) which is defined as the distribution of Eu/distribution of Am ($D_{Eu}/D_{Am}$).

TABLE 9

Extraction results under variable conditions for Eu/Am separation using water-soluble polymer B.

| Condition | SF ($D_{Eu}/D_{Am}$) |
|---|---|
| 0.5 M HDEHP/0.1 M NaNO$_3$/no polymer/pH 2.5 | 0.60 |
| 0.5 M HDEHP/0.1 M NaNO$_3$/no polymer/pH 3.2 | 0.85 |
| 0.5 M HDEHP/0.1 M NaNO$_3$/no polymer/pH 3.5 | 1.0 |
| 0.1 M HDEHP/1.0 M LiClO$_4$/2 wt/vol % polymer/pH 4.4 | 2.1 |
| 0.1 M HDEHP/0.1 M LiClO$_4$/2 wt/vol % polymer/pH 4.2 | 3.6 |
| 0.1 M HDEHP/0.1 M LiCl/0.2 wt/vol % polymer/pH 3.0 | 2.9 |
| 0.1 M HDEHP/0.1 M LiCl/0.5 wt/vol % | 4.1 |

TABLE 9-continued

Extraction results under variable conditions for Eu/Am separation using water-soluble polymer B.

| Condition | SF ($D_{Eu}/D_{Am}$) |
|---|---|
| polymer/pH 3.0 0.1 M HDEHP/0.1 M LiCl/2 wt/vol % polymer/pH 3.1 | 11.7 |
| 0.1 M HDEHP/2 wt/vol % polymer/1.5 M lactic acid/pH 3.1 | 27.5 |
| 0.1 M HDEHP/0.1 M NaNO$_3$/2% polymer/1.5 M lactic acid/pH 2.4 | 23.1 |
| 0.2 M HDEHP/0.1 M NaNO$_3$/2 wt/vol % polymer/1.0 M lactic acid/pH 2.9 | 8.1 |
| 0.1 M HDEHP/0.05 M DTPA/1.5 M lactic acid/pH 3.4 | 10.2 ($D_{Am}/D_{Eu}$) |

EXAMPLE 11

Using polymers A, C, and E, tests were performed to determine the selective recovery of metal ions used in the electroplating industry from solutions that have chloride, sulfate and nitrate counter ions. Individual solutions containing 0.1M sulfate, 0.1M nitrate and 0.1M chloride with 0.1 wt/vol % of the three polymers (A, C, or E) were prepared at a pH range of 2 to 7. All solutions contained copper(II), nickel(II), aluminum(III), iron(III), chromium (VI), zinc(II), lead(II), and cadmium(II) ions at the 10 to 20 ppm range (low end concentration range expected in electroplating rinse waters or other types of waste water or process waters). Ten milliliters of the resulting solutions were centrifuged using the Centriprep-10 unit (Amicon) having a MWCO of 10,000 until eight mL passed the membrane. The top (retentate) and bottom (permeate) portions were analyzed by ICP-AEC for metal ion content. The results are summarized below in Tables 10(a)–10(h).

TABLE 10a

Metals concentrations in the permeate with polymer A in 0.1 M chloride.

| run no. | pH | ppm Cu | ppm Ni | ppm Al | ppm Fe | ppm Cr | ppm Zn | ppm Pb | ppm Cd |
|---|---|---|---|---|---|---|---|---|---|
| 0 | 2.00 | 5.22 | 14.33 | 13.03 | 11.50 | 11.68 | 12.73 | 10.58 | 12.55 |
| 1 | 2.87 | 0.10 | 14.25 | 12.58 | 10.93 | 12.85 | 12.85 | 11.48 | 12.68 |
| 2 | 4.03 | 0.024 | 2.89 | 11.63 | 2.32 | 7.89 | 10.94 | 12.11 | 10.29 |
| 3 | 4.78 | 0.024 | 0.04 | 2.19 | 0.44 | 0.63 | 0.63 | 9.60 | 0.20 |
| 4 | 5.94 | 0.67 | 0.32 | 0.31 | 0.31 | 0.04 | 0.14 | 1.34 | 0.06 |

TABLE 10b

Metals concentrations in the permeate with polymer C in 0.1 M chloride.

| run no. | pH | ppm Cu | ppm Ni | ppm Al | ppm Fe | ppm Cr | ppm Zn | ppm Pb | ppm Cd |
|---|---|---|---|---|---|---|---|---|---|
| 0 | 2.02 | 4.53 | 4.80 | 10.94 | 4.30 | 10.94 | 6.75 | 7.94 | 9.37 |
| 1 | 2.91 | 0.20 | 0.51 | 8.11 | 0.33 | 11.08 | 0.37 | 0.48 | 0.96 |
| 2 | 3.74 | 0.05 | 0.38 | 3.38 | 0.09 | 9.03 | 0.10 | 0.30 | 0.30 |
| 3 | 4.75 | 0.77 | 1.19 | 0.97 | 0.76 | 5.16 | 0.88 | 0.77 | 0.84 |
| 4 | 5.76 | 0.03 | 0.31 | 0.06 | 0.06 | 0.38 | 0.08 | 0.30 | 0.30 |
| 5 | 6.53 | 0.03 | 0.30 | 0.05 | 0.06 | 0.05 | 0.06 | 0.16 | 0.04 |

TABLE 10c

Metals concentrations in the permeate with polymer E in 0.1 M chloride.

| run no. | pH | ppm Cu | ppm Ni | ppm Al | ppm Fe | ppm Cr | ppm Zn | ppm Pb | ppm Cd |
|---|---|---|---|---|---|---|---|---|---|
| 0 | 2.05 | 0.98 | 12.89 | 0.55 | 0.41 | 11.46 | 11.78 | 10.63 | 12.07 |
| 1 | 2.94 | 0.80 | 7.34 | 0.08 | 0.03 | 11.36 | 7.51 | 7.45 | 9.97 |
| 2 | 3.93 | 0.23 | 0.97 | 0.23 | 0.24 | 7.51 | 0.91 | 1.17 | 1.79 |
| 3 | 4.67 | 0.23 | 0.58 | 0.24 | 0.20 | 2.89 | 0.62 | 0.11 | 0.39 |
| 4 | 5.54 | 0.87 | 0.58 | 1.94 | 5.70 | 0.30 | 0.10 | 1.12 | 0.30 |
| 5 | 6.97 | 0.15 | 0.33 | 0.27 | 1.01 | 0.15 | 0.10 | 1.00 | 0.30 |

TABLE 10d

Metals concentrations in the permeate with polymer C in 0.1 M sulfate.

| run no. | pH | ppm Cu | ppm Ni | ppm Al | ppm Fe | ppm Cr | ppm Zn | ppm Pb | ppm Cd |
|---|---|---|---|---|---|---|---|---|---|
| 0 | 2.18 | 0.06 | 0.11 | 8.61 | 0.26 | 8.25 | 3.28 | 6.75 | 8.11 |
| 1 | 2.92 | 0.07 | 0.05 | 5.13 | 0.21 | 8.47 | 0.37 | 1.81 | 2.13 |
| 2 | 3.86 | 0.04 | 0.05 | 1.57 | 0.10 | 8.19 | 0.10 | 0.60 | 0.30 |
| 3 | 4.93 | 0.03 | 0.10 | 0.18 | 0.10 | 3.38 | 0.10 | 0.60 | 0.30 |
| 4 | 6.02 | 0.17 | 0.29 | 0.22 | 0.22 | 0.27 | 0.20 | 0.60 | 0.30 |

TABLE 10e

Metals concentrations in the permeate with polymer E in 0.1 M sulfate.

| run no. | pH | ppm Cu | ppm Ni | ppm Al | ppm Fe | ppm Zn | ppm Pb | ppm Cd |
|---|---|---|---|---|---|---|---|---|
| 0 | 3.95 | 0.08 | 0.48 | 0.10 | 0.10 | 0.76 | 0.60 | 0.90 |
| 1 | 5.11 | 0.09 | 0.07 | 0.10 | 0.10 | 0.17 | 0.60 | 0.30 |
| 2 | 6.09 | 0.07 | 0.10 | 0.10 | 0.10 | 0.09 | 0.60 | 0.30 |
| 3 | 7.06 | 0.07 | 0.06 | 0.10 | 0.10 | 0.10 | 0.60 | 0.30 |

TABLE 10f

Metals concentrations in the permeate with polymer A in 0.1 M nitrate.

| run no. | pH | ppm Cu | ppm Ni | ppm Al | ppm Fe | ppm Cr | ppm Zn | ppm Pb | ppm Cd |
|---|---|---|---|---|---|---|---|---|---|
| 0 | 2.04 | 3.96 | 5.19 | 4.99 | 3.75 | 3.71 | 4.76 | 2.95 | 4.31 |
| 1 | 3.05 | 0.15 | 5.16 | 4.88 | 2.83 | 3.47 | 5.39 | 2.97 | 4.28 |
| 2 | 4.02 | 0.052 | 3.72 | 4.72 | 0.44 | 2.67 | 5.34 | 2.80 | 4.36 |
| 3 | 4.97 | 0.021 | 0.035 | 1.86 | 0.049 | 1.73 | 2.57 | 2.54 | 2.70 |
| 4 | 6.21 | 0.034 | 0.02 | 0.01 | 0.01 | 1.15 | 0.088 | 0.33 | 0.042 |
| 5 | 6.86 | 0.047 | 0.02 | 0.01 | 0.0i | 1.49 | 0.081 | 0.03 | 0.045 |

TABLE 10g

Metals concentrations in the permeate with polymer C in 0.1 M chloride.

| run no. | pH | ppm Cu | ppm Ni | ppm Al | ppm Fe | ppm Cr | ppm Zn | ppm Pb | ppm Cd |
|---|---|---|---|---|---|---|---|---|---|
| 0 | 1.91 | 0.223 | 0.319 | 12.66 | 0.508 | 2.513 | 4.907 | 2.875 | 8.702 |
| 1 | 2.89 | 0.190 | 0.281 | 6.22 | 0.358 | 2.314 | 0.449 | 0.40 | 1.525 |
| 2 | 3.71 | 0.158 | 0.276 | 1.01 | 0.214 | 1.881 | 0.211 | 0.40 | 0.244 |
| 3 | 4.97 | 0.138 | 0.207 | 0.442 | 0.308 | 1.667 | 0.185 | 0.40 | 0.225 |
| 4 | 5.99 | 0.117 | 0.185 | 0.316 | 0.343 | 1.853 | 0.154 | 0.40 | 0.143 |
| 5 | 6.94 | 0.086 | 0.124 | 0.226 | 0.231 | 2.272 | 0.124 | 0.40 | 0.111 |

TABLE 10h

| Metals concentrations in the permeate with polymer E in 0.1 M chloride. | | | | | | | | | |
|---|---|---|---|---|---|---|---|---|---|
| run no. | pH | ppm Cu | ppm Ni | ppm Al | ppm Fe | ppm Cr | ppm Zn | ppm Pb | ppm Cd |
| 0 | 2.05 | 0.405 | 4.991 | 0.071 | 0.056 | 0.360 | 4.624 | 3.354 | 4.249 |
| 1 | 3.10 | 0.075 | 3.111 | 0.032 | 0.034 | 0.271 | 3.211 | 2.166 | 3.177 |
| 2 | 4.06 | 0.058 | 0.22 | 0.027 | 0.036 | 0.176 | 0.391 | 0.074 | 0.401 |
| 3 | 5.21 | 0.051 | 0.041 | 0.028 | 0.010 | 0.258 | 0.064 | 0.030 | 0.031 |
| 4 | 6.34 | 0.043 | 0.02 | 0.01 | 0.031 | 0.449 | 0.078 | 0.030 | 0.015 |
| 5 | 7.06 | 0.045 | 0.02 | 0.01 | 0.020 | 2.128 | 0.046 | 0.030 | 0.010 |

It can be observed that the binding properties of the three polymers are quite different and the binding properties of each polymer varied depending upon the counter ion (i.e., sulfate, chloride or nitrate) in the solution. In sulfate solution the polymers experienced solubility problems with polymer A being insoluble at <pH 5, polymer E insoluble at <pH 3 and polymer C insoluble at <pH 2.5. The other polymers were completely soluble at all conditions studied. Thus, this data demonstrates the importance of knowing the counter ions that exist in the waste streams (along with the anion concentration) to be able to choose the proper polymer or polymers for the desired separation. It demonstrates that certain polymers remove metal ions from solution to a lower level than others under the same pH conditions. The data demonstrates that where the metal ions might be bound under certain anion conditions, that they may be selectively released using different anions as eluents. The data demonstrates that if one is treating waste streams that have higher levels of metal ions to be recovered and lower levels of trace impurity metals that must be removed from a waste stream but separated from the major metals, that mixtures or formulations of polymers can be developed to address specific waste streams.

EXAMPLE 12

Recovery of Zn and Ni from electroplating rinse baths containing borate, ammonium and chloride ions (single polymer systems) was conducted as follows. Retention studies were performed on dilute electroplating bath solutions for evaluating the individual polymer's effectiveness in retaining the electroplating metals in the presence of other bath constituents. The composition of the bath used was made according to Table E as the Zn/Ni alloy bath.

Surfactant was left out of this surrogate solution since it would be removed by carbon treatment prior to ultrafiltration. Note that when polymer filtration is preceded by surfactant and oils removal using carbon or polymers such as XAD-4 (from Rohm and Haas), and followed by ion exchange treatment to allow for removal of additional inorganic ions that are not selectively removed by the polymer filtration process, clean water which can be used for recycle can be obtained.

The bath was diluted 1:100 to simulate rinse waters resulting in Ni and Zn metal ion concentrations in the range of 180 ppm and 90 ppm, respectively. The concentrations of the other species in solution were diluted in the same proportions. The general procedure for retention studies involved the addition of an excess of purified polymer (polymer A or polymer B) to the dilute rinse waters. The solutions were adjusted to the desired pH (1–7) and ultrafiltered through a 10,000 MWCO polysulfone membrane using a stirred cell. The volumes of retentate and permeate were measured and both analyzed for Ni and Zn by ICP-AES. The results are shown in Table 11.

TABLE 11

Percent metal retained for polymer A and polymer B from a Zn/Ni electroplating rinse bath.

| pH | Ni-polymer A | Zn-polymer A | Ni-polymer B | Zn-polymer B |
|---|---|---|---|---|
| 1.0 | 63.7 | 55.5 | 60.0 | 66.9 |
| 2.0 | 61.8 | 57.8 | 79.6 | 42.9 |
| 3.0 | 59.6 | 54.9 | 97.9 | 92.9 |
| 4.0 | 91.7 | 95.0 | 100 | 95.2 |
| 5.0 | 97.9 | 100 | 100 | 96.5 |
| 6.0 | 96.6 | 100 | 100 | 97.2 |
| 7.0 | 97.8 | 100 | 100 | 89.3 |

Polymer A gave good retention for both metals at pH 5 and above indicating that polymer A could readily compete with ammonia in the electroplating solution. Below pH 5, polymer A began to release the metals and by pH 3, most metals were free in solution. Within experimental error, there were no differences in the selectivity of polymer A for one metal over the other and therefore no possibility of selective stripping. A similar trend in Ni/Zn retention was observed for polymer B. However, there was a shift in the pH at which the metal ions were released. This shift towards a lower pH was a result of the higher stability constants for the polymer B-metal ion complexes over those of the polymer A-metal ion complexes. Polymer B formed a slightly stronger complex with Ni over Zn as shown with the higher retention's for Ni at pH 3 and pH 2. Regeneration studies were run to investigate the ability of the polymers to go through a full cycle of metal ion retention/concentration, metal-ion recovery by diafiltration, and polymer reloading using the electroplating rinse waters. In a general procedure, dilute electroplating bath solutions (50 mL) were treated with an excess of polymer at pH 6. These solutions were concentrated a 10 mL using a stirred cell with a 10,000 MWCO membrane. The metal ions were released from the polymer by adjusting the pH and collected by diafiltering. This procedure was repeated an additional two times after raising the pH of the polymer retentate back to 6. For polymer A regeneration studies, the initial concentrations of Ni and Zn the solution at pH 6 were 45 ppm and 24 ppm, respectively as determined by ICP-AES. During the first concentration to 10 mL, retention of the Ni and Zn gave no detectable metals (detection limit 0.01 ppm) in the permeate. After adjustment of the pH to 2, the solution was diafiltered with six volume equivalents collected. The percent metal ion (Ni, Zn) retained after each volume equivalent was slightly above the theoretical values calculated for retention coefficient (σ), indicating some weak polymer/metal ion interactions were still were felt even at pH 2.

The second and third regeneration results were similar to that of the first. In both concentration steps no metals were detected in the permeate (detection limit <0.01 ppm), indicating excellent retention. The two diafiltrations followed a similar trend with all curves falling slightly above the theoretical values for σ=0. The conclusions of the study indicate that polymer A can successfully retain electroplating bath metals from dilute solutions, concentrate, strip of metal and recycle without the loss of performance. Experiments with polymer B gave similar results but the stripping pH was 0.35 instead of pH 2.

While the above experiments were performed using the small stirred cells, the following experiment processed ~5.5 L of simulated dilute electroplating bath rinse water solution using a hollow-fiber ultrafiltration cartridge to determine the effectiveness of polymer A in retaining, concentrating, and recovering the plating bath metals from the bulk of the solution. The initial concentrations of Ni and Zn in the solution as determined by ICP-MS was 164.5 ppm and 91.4 ppm, respectively. The boron concentration from boric acid was 31.7 ppm. The pH of the solution was adjusted to 6.3 by the addition of concentrated hydrochloric acid.

Conditions for the process involved using a 10,000 MWCO hollow-fiber cartridge (1.5 sq. ft. 0.14 sq m). Recirculation rates of 4 L/min. were maintained using a peristaltic pump. The operating back pressure was 15 psig (pure water flux at this back pressure was 147 mL/min.). The initial concentration of polymer A was 0.12 wt/vol %. Based on previous loading capacity results, quantitative Ni/Zn metal ion retention would take-up approximately 70% of the polymer's capacity (based on 0.25 g metal/g polymer). The final volume of the solution after the concentration step was ~350 mL or about 15 fold concentration. Permeate rates were taken every 1000 mL, and indicated that after the first 3000 mL of permeate collected, their was no decrease in the flux rates which were 65% of that of pure water. This is despite an increase in polymer concentration from 0.12% to 0.21 wt/vol %. Only after 4000 mL of permeate was collected did the flux rates begin to drop. During this volume reduction, the average concentration of metal ions in the permeate was ~1 ppm for Ni and 2.3 ppm for Zn indicating good retention by the polymer.

After the solution was concentrated by a factor of 15, the metals were released from the polymer by the addition of concentrated hydrochloric acid to a final pH of 2.0. At this point, the initial permeate from the diafiltration process was calculated to show a metal ion concentration approximately ten times that of the initial metal ions concentrations (164.5 ppm Ni, 91.4 ppm Zn). The results from the ICP-MS were in close agreement showing 1617 ppm Ni and 1009 ppm Zn in the first volume equivalent of permeate. The concentrations of Ni and Zn in successive permeate fractions follow the expected decrease as seen in previous experiments.

Whether there was any interaction between the boric acid and the polymer was then investigated. With the possibility of hydrogen bonding between the two species, boric acid might also be concentrated to a certain degree. The initial concentration of boron in the solution before volume reduction was 31.7 ppm. The concentration in the permeate during the volume reduction was ~34 ppm and the concentration of boron during the diafiltration process after acidification was 31.5 ppm in the first permeate fraction with each subsequent volume equivalent showing a decrease in concentration. This is strong evidence that there was little, if any, interaction between the polymer and the boric acid and therefore boric acid should not interfere with the polymer/metal ion binding.

EXAMPLE 13

Recovery of zinc and nickel from electroplating rinse baths containing copper and iron metal ion impurities plus borate, ammonium and chloride ions (two polymer system):
From the previous experiments it was evident that in waste streams containing only nickel and/or zinc, a single polymer system can be used for metal ion recovery in the presence of ammonia or borate. However, in the presence of other metal ion impurities such as those described in Example 11, polymer A (PEI) alone would not show the needed selectivity for the recovery of the nickel and/or zinc. At a higher pH (6–7), PEI is selective for those metals described in Example 11 over sodium, potassium, lithium, calcium, and magnesium (alkaline and alkaline earth metals of group Ia, and Ia), but the selective separation of zinc and/or nickel from iron, cadmium, lead, aluminum and chromium and copper could not be accomplished by stripping, since all these metals gave similar pH retention profiles with PEI. The addition of a second polymer, such as polymer C in appropriate amounts, which has a greater affinity for the trace metal impurities such as copper and iron would act as a scavenger for these metal impurities. Thus, by using polymer A for the primary binding of nickel and zinc and polymer C for the scavenging of metal impurities, the performance of the process can be improved.

By mixing polymer A with Polymer C (which has a different binding profile than polymer A) in such a proportion that polymer C will act as a scavenger for the trace metals of copper and iron while polymer A is the major binder of the metals like zinc and nickel, improved performance and selectivity for the process should be possible.

A test treatment of 40 gallons of electroplating rinse water was conducted. A solution for testing was made from the Zn/Ni electroplating bath formulation from Table E above. The electroplating bath solution was diluted approximately 1:100 to simulate the rinse waters. In addition to the nickel and zinc, low concentrations (1–4 ppm) of five other metals were introduced to the 40 gallons to simulate possible impurities found in the plating solutions. These five metals ions were aluminum(III), lead(II), copper(II), cadmium(II), chromium(III), and iron(III). The polymer mixture consisted of 90% polymer A and 10% polymer C. This polymer mixture had an initial concentration of 0.15 wt/vol %. Based on results obtained from previous loading capacity studies, calculations indicated the retention of all metal ions in solution gave 80% loading of the polymers. The analysis of the initial feed solution to be processed was performed by ICP-MS with the following results shown in Table 12:

TABLE 12

| Concentration of metal ion species in the initial feed solution of a Ni/Zn rinse bath. | | | |
|---|---|---|---|
| Metal | ppm | Metal | ppm |
| B | 19.90 | Zn | 69.8 |
| Cr | 1.02 | Al | 2.11 |
| Fe | 3.77 | Cu | 2.35 |
| Pb | 2.66 | Cd | 4.03 |

Upon the addition of the polymer to the metal ion solution, various colors were evident indicating the formation of polymer-metal complexes. Once the polymer was completely added with thorough stirring, a dark purple solution, indicative of the PEI-nickel complex, could be seen. During the concentration stage of the experiment (using a hollow fiber ultrafiltration cartridge with a 10,000 MWCO), the expected decrease in the permeate flow rate as well as the total volume of permeate collected as a function of time was observed. The total time to process the forty plus gallons of the solution was approximately one hour.

The permeate collected during the concentration stage was analyzed for metal ion content and gave a nickel concentration of 1.94 ppm and a zinc concentration of 1.36 ppm. While these concentrations were below discharge levels, they were greater than the goal of <1 ppm for both of the metals (it has since been found that when the process system was at pH 6.5 this was the permeate concentrations, if the process was run at pH 7 the permeate was <0.01 ppm). The analysis for all impurity metals added to the solution were found to be less than 0.05 ppm in the permeate.

Once the solution was concentrated to approximately 1.5 gallons, the pH of the solution was lowered to 3.5 followed by diafiltration to recover the metal ions. Five volume equivalents were collected with each fraction being analyzed for metal ion concentration (Table 13). It is clear from the results that pH 3.5 is not the optimum pH for nickel and zinc metal ion release. The polymer solution appears to have a greater retention for nickel than for zinc, however after five volume equivalents, significant amounts of nickel and zinc were still present in retentate.

TABLE 13

Ni/Zn concentrations remaining in various samples or fractions.

|  | Ni (ppm) | Zn (ppm) |
| --- | --- | --- |
| Permeate from Concentration | 1.94 | 1.4 |
| Volume Equivalent 1-pH 3.5 | 533 | 699 |
| Volume Equivalent 2-pH 3.5 | 422 | 376 |
| Volume Equivalent 3-pH 3.5 | 398 | 234 |
| Volume equivalent 4-pH 3.5 | 331 | 156 |
| Volume Equivalent 5-pH 3.5 | 325 | 153 |
| Volume Equivalent 1-pH 3.0 | 472 | 30 |
| Volume Equivalent 1-pH 1.0 | 81 | <4 |
| Volume Equivalent 3-pH 1.0 | 22 | 3.0 |
| Retentate after Diafiltration | 42 | 2.0 |

The results shown in Table 13 are contrary to theoretical in which greater than 95% of the metal ions should have passed through the membrane after five volume equivalents if no polymer/metal ion interactions were taking place. Analysis results for other metal ions indicate that at a pH of 3.5 all metal ions except copper and iron also began to release. The pH of the retentate was then lowered a second time to 3.0. The first volume equivalent of permeate during the second diafiltration process at pH 3.0 gave a nickel and zinc metal ion concentration of 472 ppm and 30 ppm, respectively. These results confirm that significant polymer/metal ion interactions were still taking place at pH 3.5. The pH of the retentate was lowered a third time to pH 1. The nickel concentration in the permeate was 81 ppm in the first volume equivalent and down to 22 ppm after the third volume equivalent.

Analysis of the retentate after the diafiltration process indicated that more of the nickel (42 ppm) was retained than zinc (1.9 ppm) which suggests that there was a stronger interaction between the polymers with nickel than with zinc (as shown from Example 11 for polymer C). Of the five metal impurities added to the simulated rinse water solution, only copper and iron were found to be significantly concentrated in the retentate at 17.5 ppm and 26.3 ppm, respectively. While iron showed no indication of being released from the polymer at low pH, the copper concentration in the first volume equivalent collected at pH=1 was 14.01 ppm.

Chromium(III), which should have eluted completely at pH 3 (according to previous results), distributed in all fractions and a substantial amount was still present in the final retentate. This indicated a kinetic effect as maybe the chromium was slowly being released from the polymer during all the diafiltration steps.

Several conclusions can be drawn from the results of the experiment. First, the optimum release of the nickel and zinc occurred at or below a pH of 3.0. Diafiltration at this pH will reduce the number of volume equivalents needed to recover >95% of the nickel and zinc in the concentrated rinse waters. Second, of the five impurity metals added to the simulated rinse water solution, copper and iron can be retained by the polymer mixture and separated from nickel and zinc at pH 3 under these process conditions. The copper and iron can be stripped at lower pH values and/or 0.1M chloride solutions to regenerate the polymer mixture. Third, these results again indicate how important the counter ion is in the process, not only the type of ion but its concentration. The experiment from Example 11 indicated that at 0.1M chloride only chromium(III) and aluminum(III) should elute at pH 3. Under lower chloride concentration as in this real electroplating rinse solution, lead and cadmium also eluted at pH 3 along with the zinc, nickel, chromium and aluminum. To retain the cadmium and lead, the elution could be performed in 0.1M ammonium chloride to recover zinc and nickel selectively.

EXAMPLE 14

Recovery of zinc and nickel from electroplating rinse baths containing lead, cadmium, copper, iron, and aluminum metal ion impurities plus borate, ammonium and chloride ions (three polymer system): Retention studies were performed on dilute electroplating bath solutions to evaluate a three polymer formulation's effectiveness in retaining the electroplating metals in the presence of other bath constituents. The composition of the bath used was made according to Table E as the zinc and nickel alloy bath. Surfactant was left out of the solution since it would be removed prior to ultrafiltration. The bath was diluted 1:100 to simulate rinse waters resulting in nickel and zinc metal ion concentrations in the range of 180 ppm and 90 ppm, respectively. The concentrations of the other species in solution were diluted in the same proportions. The general procedure for retention studies involved the addition of an excess of purified polymer formulation (90% polymer A, 5% polymer C, and 5% polymer E) to the dilute rinse waters. The solutions were adjusted to the desired pH (1–7) and ultrafiltered through a 10,000 MWCO polysulfone membrane using a centricon unit. The permeates were analyzed for nickel, zinc and trace metals by ICP-AES. The original metal ion concentrations were approximately 5 ppm for the trace metals and 25 ppm for the concentrated metal ions. The results are shown in Table 14.

TABLE 14

Concentration of metal ions in permeate of a simulated electroplating rinse bath after treatment with a 3-polymer formulation.

| Elements | pH 2.05 | pH 3.03 | pH 7.10 |
|---|---|---|---|
| Cu | 0.33 | 0.04 | 0.03 |
| Ni | 29.6 | 23.9 | 0.04 |
| Al | 1.78 | 0.44 | <0.01 |
| Fe | 0.17 | 0.09 | <0.01 |
| Cr | 2.82 | 1.66 | 0.05 |
| Zn | 16.3 | 15.9 | <0.01 |
| Pb | 5.71 | 5.33 | <0.01 |
| Cd | 6.33 | 6.09 | 0.02 |

It can be seen from the data in Table 14 that the three polymer system had excellent metal ion recovery at pH 7 for all the metals and that at the stripping pH values of 3 and 2 that all of the trace metal ions except lead and cadmium are very well retained and the nickel and zinc was readily recovered at this pH. There was a large improvement in the retention of aluminum in this three polymer formulation as compared to the two polymer formulation of Example 13. The use of selective stripping solutions as explained in Example 13 could also be used with the 3-polymer system to enhance selectivity.

EXAMPLE 15

Recovery of zinc and tungsten from electroplating rinse baths: Retention studies were performed on electroplating rinse solutions to evaluate the individual polymer's effectiveness in retaining the electroplating metals in the presence of other bath constituents. The composition of the bath used was made according to Table L the nickel/tungsten alloy bath. The electroplating bath solution (1.5 mL) was diluted to 500 mL to give approximately 100 ppm of nickel and tungsten solution. Either polymer A or polymer B were added to make a 0.02 wt/vol % solution in polymer. The pH was adjusted with HCl or NaOH to give 25 mL samples ranging from pH 1 to 12. The solutions were filtered in a stirred cell at 60 psi, 10,000 MWCO membrane, and the permeate collected for analysis by ICP-AES. The results are shown in Table 15. It can be seen that both polymers gave reasonable recovery of both nickel and tungsten with polymer A being the best performer at near neutral pH, which would be the normal pH of electroplating rinse water. Sulfate, a dioxoanion itself, did not appear to interfere with the tungsten metal ion recovery. Tungstate, which is also a dioxoanion (in these electroplating baths), would be better stripped at high pH values.

TABLE 15

Percent nickel and tungsten retained for polymers A and B.

| pH | polymer A % Ni (II) | polymer A % W (VI) | polymer B % Ni (II) | polymer B % W (VI) |
|---|---|---|---|---|
| 1.0 | 66.8 | 97.1 | 69.0 | ppt |
| 2.0 | 78.9 | 99.3 | 69.9 | ppt |
| 3.0 | 76.3 | 99.5 | 95.1 | 66.5 |
| 4.0 | 84.3 | 98.7 | 98.0 | 67.2 |
| 5.0 | 100 | 98.9 | 98.4 | 72.8 |
| 6.0 | 100 | 98.1 | 99.1 | 80.8 |
| 7.0 | 100 | 99.2 | 98.9 | 80.7 |
| 8.0 | 100 | 98.3 | — | — |
| 9.0 | 100 | 94.6 | — | — |
| 10.0 | 100 | 87.3 | — | — |
| 11.0 | 100 | 90.3 | — | — |
| 12.0 | 100 | 82.6 | — | — |

Other oxoanions, e.g., chromate, tungstate, molybdate, selenate, and arsenate (group VIa, VIIa, Vb, VIb ions), were tested with polymer A, polymer P, and polymer Q. These results are shown in Table 16. The solutions were prepared for these tests using polymer in 10 times excess to the metal ions in the 500 to 1000 ppm range prepared from their sodium salt. The solutions were ultrafiltered using the same stirred cell as described above and all samples (retentate and permeate) were analyzed by ICP-AES.

TABLE 16

Percent retention of oxoanions (VI valent state).

| pH | Polymer Q % As | Polymer Q % Cr | Polymer Q % W | Polymer A % Cr | Polymer A % As | Polymer A % Mo | Polymer A % W | Polymer P % As | Polymer P % Cr | Polymer P % W | Polymer P % Mo |
|---|---|---|---|---|---|---|---|---|---|---|---|
| 5.0 | 55.3 | — | 95 | — | 59.6 | 99.6 | 99.7 | 31.5 | — | 99.6 | 93.2 |
| 6.0 | — | — | — | — | — | — | — | — | — | — | — |
| 7.0 | 57.8 | 66.9 | 89 | — | 54.6 | 96.3 | 5.8 | 53.8 | — | 97.0 | 72.0 |
| 8.0 | — | 66.3 | — | 80.3 | — | — | — | 77.0 | — | — | — |
| 9.0 | 40.8 | 74.0 | 64 | 57.0 | 40.4 | 68.3 | 5.8 | 34.8 | 64.5 | 77.4 | 55.7 |
| 10.0 | — | — | — | — | — | — | — | — | — | — | — |

EXAMPLE 16

Silver recovery from photofinishing waste solutions: Waste water was obtained from a photofinishing laboratory at Los Alamos National Laboratory which contained all the rinse waters and photoprocessing solutions. The waste stream treated contained 464 ppm silver along with other materials common to photography waste as shown in Table H. This waste solution was treated with 0.25 wt/vol % polymer A, adjusted to the pH with nitric acid or sodium hydroxide, and filtered through a Centricon-10 (Amicon)

unit with a 10,000 MWCO membrane. The results are shown in Table 17. It can be seen that silver was retained (>90%) at lower pH values which indicates that it is being bound as the anion in this example, probably as the thiosulfate.

TABLE 17

Recovery of silver from photofininshing waste stream.

| pH | Ag ppm in permeate |
|----|---------------------|
| 4  | 37                  |
| 5  | 58                  |
| 6  | 129                 |
| 8  | 460                 |
| 9  | 440                 |

464 ppm silver in starting waste solution

EXAMPLE 17

Recovery of metal ions from acid mine drainage waters: Samples of mine drainage water from the Berkeley Pit, Butte, Mont. were obtained. The sample has the analysis as shown in Table G. The sample was very high in iron and aluminum. The next most abundant metal ions were copper and zinc. There are several strategies to treating the waste. One was to remove all metal ions from the waste stream meeting discharge limits into the local streams or sewer system. The other approach was the recovery of metal values at the same time that discharge limits were being met. The solution was treated with a series of polymers and polymer formulations to recover all the metals both trace (<10 ppm) and major metals. Iron was considered a nuisance metal and there were several strategies to remove it first by some precipitation step so that it would not saturate the polymers capacity to bind the other metals. Aluminum was partly considered a nuisance unless it might have some metal value assuming it could be recovered in a pure form. Thus, for these studies, it too was partly removed by precipitation. Thus, the sample was first treated with dilute base to raise the pH from 2.8 to 4 to allow a large portion of the iron and some aluminum to precipitate. The resulting solution had the metal analysis shown in Table 18. The solution was also treated in several ways to determine an effective way to remove all toxic metals and to potentially recover valuable metals. These treatments are also shown in Table 18. It can be seen that the use of polymer A to precipitate iron and aluminum was most effective. The polymer A then bound metals such as copper, as indicated by the bright blue color of the solution. It was assumed that further addition of polymer A and/or raising the pH to 6 or 7 would then bind zinc and the rest of the copper for further separation by ultrafiltration.

TABLE 18

Metal content in ppm of Berkeley Pit Mine Drainage water after various treatments.

| Element | Untreated sample* pH 2.6 | After NaOH pH 3.0** | After KOH pH 3.8** | After NH₄OH pH 3.8** | After Polymer A pH 4.8** | After polymer C pH 5.6*** |
|---------|--------------------------|---------------------|---------------------|-----------------------|--------------------------|---------------------------|
| Fe | 17.21 | 4.47(26%) | 2.97(17%) | 0.02(<1%) | 0.0(<1%) | <0.01 |
| Mn | 3.99 |  |  |  | 4.12 (103%) |  |
| Al | 5.92 | 4.51(76%) | 4.29(72%) | 3.64(62%) | 0.31(5%) | <0.01 |
| Cu | 3.74 | 3.33(89%) | 3.25(87%) | 3.04(81%) | 3.04(81%) | <0.01 |

TABLE 18-continued

Metal content in ppm of Berkeley Pit Mine Drainage water after various treatments.

| Element | Untreated sample* pH 2.6 | After NaOH pH 3.0** | After KOH pH 3.8** | After NH₄OH pH 3.8** | After Polymer A pH 4.8** | After polymer C pH 5.6*** |
|---------|--------------------------|---------------------|---------------------|-----------------------|--------------------------|---------------------------|
| Mg | 8.82 |  |  |  | 8.7(98%) |  |
| Zn | 10.74 | 10.95 (103%) | 10.8 (100%) | 9.82(92%) | 11.2 (104%) | <0.01 |

*Values are the amount in mg of each metal in 20 mL of Berkeley Pit water.
**Values are reported as mg of metal remaining in solution after precipitation from 20 mL of Berkeley Pit Water. Values in parenthesis are the percent of metal remaining in solution based on original Berkeley Pit water.
***Sample from NaOH precipitation treated with 0.12% weight polymer.

EXAMPLE 18

Recovery of technetium from aqueous streams: Technetium (Tc) exists in a variety of waste waters in the nuclear industry, in ground water plumes, and in nuclear medicine wastes. An example waste stream that has large quantities of Tc is in the Hanford Tanks at Hanford, Wash. at the nuclear facility. Though the tanks have varied compositions they typically are very high in salts and a typical simulant is given in Table K. In contrast, ground water will have low salt content and few competing ions. A variety of permethylated polymers (polyvinylamine, polyallylamine, polyethyleneimine and poly(vinylpyridine))(polymers N, O, Q, S, and Sa) and crown ether-containing polymers (polymer L and M) were tested for their ability to recover technetium from a variety of aqueous solutions representing from clean-water aquifers to brine solutions to basic solutions.

The polymers were dissolved in water to give from 0.05 to 0.3 wt/vol % solutions. The solutions were spiked with Tc-95m. After mixing, from 1 to 2 mL of the solutions were ultrafiltered in a Centricon UF unit. A blank test was performed similar to above without polymer and was determined to have minimal holdup in the Centricon unit. The top (retentate) and bottom (permeate) of the units were counted on a NaI detector. The formula as given in Example 1 was used to calculate $K_d$ values. The results are summarized in Table 19. For the permethylated materials, the extraction was best at low ionic strength.

TABLE 19

Summary of selected polymers' retention of technetium.

| Polymer | Condition | $K_d$ |
|---------|-----------|-------|
| Permethylated Polyethyleneimine-SO₄, Polymer Q | 0.5 M NO₃, pH 7 | 73 |
| Permethylated Polyethyleneimine-SO₄, Polymer Q | 0.1 M NO₃, pH 7 | 260 |
| Permethylated Polyethyleneimine-SO₄, Polymer Q | 0.01 M NO₃, pH 7 | 2384 |
| Permethylated Polyethyleneimine-SO₄, Polymer Q | 0.005 M NO₃, pH 7 | 4548 |
| Permethylated Polyethyleneimine-SO₄, Polymer Q | 0.0 M NO₃, pH 7 | 20788 |
| Permethylated Polyvinylamine-Cl, Polymer N | 0.1 M NO₃, pH 7 | 205 |
| Permethylated Polyvinylamine-Cl, Polymer N | 0.01 M NO₃, pH 7 | 1310 |
| Permethylated Polyvinylamine-Cl, Polymer N | 0.005 M NO₃, pH 7 | 2394 |
| Permethylated Polyvinylamine-Cl, | 0.0 M NO₃, pH 7 | 12900 |

TABLE 19-continued

Summary of selected polymers' retention of technetium.

| Polymer | Condition | $K_d$ |
|---|---|---|
| Polymer N Permethylated Polyvinylamine-Cl, Polymer N | pH 13 (with NaOH) | 700 |
| Permethylated Polyvinylamine-Cl, Polymer N | pH 1.5 (with $HNO_3$) | 470 |
| Permethylated Polyallylamine-Cl, Polymer O | 0.5 M $NO_3$, pH 7 | 83 |
| Permethylated Polyallylamine-Cl, Polymer O | 0.1 M $NO_3$, pH 7 | 243 |
| Permethylated Polyallylamine-Cl, Polymer O | 0.01 M $NO_3$, pH 7 | 2485 |
| Permethylated Polyallylamine-Cl, Polymer O | 0.005 M $NO_3$, pH 7 | 7979 |
| Permethylated Polyallylamine-Cl, Polymer O | 0.0 M $NO_3$, pH 7 | 60570 |
| Polyvinylpyridinium-Cl, Polymer Sa | 0.5 M $NO_3$, pH 7 | 82 |
| Polyvinylpyridinium-Cl, Polymer Sa | 0.1 M $NO_3$, pH 7 | 231 |
| Polyvinylpyridinium-Cl, Polymer Sa | 0.01 M $NO_3$, pH 7 | 2202 |
| Polyvinylpyridinium-Cl, Polymer Sa | 0.005 M $NO_3$, pH 7 | 3592 |
| Polyvinylpyridinium-Cl, Polymer Sa | 0.0 M $NO_3$, pH 7 | 23246 |
| Polyvinylpyridinium-I, Polymer S | 0.1 M $NO_3$, pH 7 | 154 |
| Polyvinylpyridinium-I, Polymer S | 0.01 M $NO_3$, pH 7 | 823 |
| Polyvinylpyridinium-I, Polymer S | 0.005 M $NO_3$, pH 7 | 1246 |
| Polyvinylpyridinium-I, Polymer S | 0.0 M $NO_3$, pH 7 | 8703 |
| Crown 1, Polymer L | 2.6 M $KNO_3$, pH 7 | 44 |
| Crown 2, Polymer M | 1 M NaOH | 28 |

EXAMPLE 19

Recovery of metal ions from textile waste waters was tested as follows: Textile waste waters were obtained and have the composition shown in Table M. Polymer was added to the solution to make the solution 0.4 wt/vol % in polymer and the solutions were mixed. No pH adjustment was made. The solutions (2 mL) were filtered through the 10,000 MWCO Centricon units used in the other examples and the permeate was analyzed for metal content by ICP-AES. As can be seen from the results in Table 20, the Cu and Cr were removed to below most discharge limits.

TABLE 20

Recovery of metals from textile waste waters.

| Sample | Sample 1 | Sample 2 | Sample 3 |
|---|---|---|---|
| pH | 10.7 | 4.5 | 4.5 |
| Primary heavy metal (mg/L) | Cu (575 ppm) | Cu (1000) | Cr (1000) |
| After Treatment with polymer A | Cu < 0.1 ppm | Cu 0.19 ppm | — |
| After Treatment with polymer C | — | — | Cr 0.03 ppm |

EXAMPLE 20

Sulfur containing water-soluble polymers were tested for a variety of transition metals. A stock solution of polymer was prepared by dissolving 1.00 g of the selected polymer in 40 mL of millipore water. A stock solution of metals was prepared by mixing 5 mL each of the appropriate 1000 ppm ICP standard in a 50 mL volumetric flask and bringing the volume to the mark. The ionic strength adjustment solution was prepared by dissolving 10.62 g (0.125 moles) $NaNO_3$ in a 50 mL volumetric flask and diluting to the mark.

The sample was prepared by mixing in a plastic beaker 5 mL of the stock metal solution, 5 mL of the stock polymer solution, 2 mL of the 2.5M $NaNO_3$ solution and 20 mL of millipore water. The pH was brought to the appropriate value by the addition of 0.1M NaOH. After allowing the mixture to equilibrate for 30 minutes, it was added to a 50 mL volumetric flask, washed in with 3×2 mL water and diluted to the mark. The solution was then transferred to a 50 mL stirred ultrafiltration cell with a 10,000 MWCO filter. The first 10 mL of permeate was discarded and the next 12 mL was collected for analysis by ICP. The procedure was repeated separately for each pH and each polymer (polymers Y, Z and AA) and the results are summarized in Table 21.

TABLE 21

Binding of metals by sulfur containing derivatives of polyethyleneimine.
(% metal bound vs pH)

| Polymer Z | | | | | | | | |
|---|---|---|---|---|---|---|---|---|
| pH | Cu | Fe | Ni | Co | Zn | Cd | Pb | Mn |
| 2 | 68 | 20 | 0 | 0 | 0 | 0 | 0 | 0 |
| 3 | 100 | 32 | 2 | 4 | 1 | 3 | 3 | 7 |
| 4 | 100 | 92 | 16 | 12 | 2 | 5 | 25 | 5 |
| 5 | 100 | 100 | 98 | 83 | 22 | 17 | 20 | 3 |
| 6 | 100 | 100 | 100 | 96 | 100 | 100 | 88 | 3 |
| 7 | 100 | 100 | 100 | 90 | 100 | 100 | 100 | 0 |

| Polymer AA | | | | | | | | |
|---|---|---|---|---|---|---|---|---|
| pH | Cu | Ni | Co | Fe | Mn | Zn | Cd | Pb |
| 2 | 100 | 0 | 0 | 0 | 0 | 0 | 0 | 0 |
| 3 | 100 | 2 | 6 | 11 | 3 | 3 | 10 | 18 |
| 4 | 100 | 5 | 8 | 96 | 5 | 4 | 22 | 28 |
| 5 | 100 | 64 | 27 | 99 | 7 | 13 | 73 | 39 |
| 6 | 100 | 100 | 91 | 100 | 9 | 92 | 100 | 75 |
| 7 | 100 | 100 | 100 | 100 | 17 | 100 | 100 | 100 |

TABLE 21-continued

Binding of metals by sulfur containing derivatives of polyethyleneimine.
(% metal bound vs pH)

Polymer Y

| pH | Pb | Cu | Fe | Cd | Ag | Ni | Mg | Mn | Zn | Ca |
|---|---|---|---|---|---|---|---|---|---|---|
| 1 | 2 | 0 | 1 | 1 | 100 | 9 | 4 | 3 | 5 | 0 |
| 3 | 96 | 75 | 0 | 97 | 100 | 4 | 10 | 0 | 28 | 2 |
| 5 | 99 | 100 | 22 | 100 | 100 | 55 | 7 | 12 | 80 | 0 |
| 7 | 99 | 100 | 94 | 99 | 100 | 92 | 7 | 32 | 98 | 19 |
| 9 | 99 | 100 | 100 | 97 | 99 | 98 | 20 | 70 | 97 | 40 |

EXAMPLE 21

An experiment simulating cooling tower water evaporation was performed. Tap water (1000 mL, from Espanola, N.M.) was evaporated under low vacuum on a rotavap at 50° C. just until solid scale started to precipitate (concentrated to 775 mL) and caused the water to become cloudy. To another 1000 mL of tap water was added the polymer from example C to give a 0.1 wt/vol % solution. The second solution was treated the same as the first but this time the solution was evaporated to 480 mL before any precipitation was observer, indicating that the polymer can keep dissolved hardness ions in solution possibly reducing scale.

Further experimentation with pure water (15 mL) to which had been added calcium carbonate (50 ppm) and the polymer in example C (0.1 wt/vol %) at pH 7.5, indicated that upon ultrafiltration using a centricon unit such that half of the solution was filtered, that 525.0 ug of calcium was in the retentate and 157.5 ug was in the permeate. This indicates that under neutral to slightly basic conditions that calcium is somewhat retained and that this process could be used to remove calcium or scale-forming metal ions from cooling tower waters or other process waters.

EXAMPLE 22

Acetylpyrazolone (polymer F) and diamide (polymer R) containing polymers were tested with a variety of transition metal ions. Solution (15 mL) containing 10 ppm of metal ions was made 0.1 wt/vol % in polymer. The ionic strength was maintained at 0.1 with ammonium sulfate. The solution was filtered through a Centraprep (Amicon, cellulose membrane) unit with a 10,000 MWCO until half of the volume was filtered. The permeates were measured for metal content using ICP-AES. The results are given in the accompanying Tables 22. A blank under the same conditions in the absence of polymer is also shown. The retention of certain metals at high pH values are where the metal hydroxide precipitates from solution and the material is collected as a solid.

TABLE 22

Metal concentration in the permeate.

| pH | Al | Cd | Cr | Cu | Fe | Ni | Pb | Zn |
|---|---|---|---|---|---|---|---|---|
| | | | | Polymer F | | | | |
| 1 | 84.57 | 91.93 | 92.29 | 63.87 | 97.56 | 92.42 | 90.06 | 90.73 |
| 2 | 76.21 | 91.93 | 91.28 | 12.57 | 96.62 | 85.03 | 88.18 | 90.73 |
| 3 | 60.41 | 95.68 | 92.29 | 4.19 | 82.55 | 35.12 | 93.81 | 91.72 |
| 4 | 41.82 | 58.16 | 91.28 | 8.38 | 72.23 | 10.17 | 62.85 | 53.25 |
| 5 | 28.81 | 10.32 | 65.92 | 7.33 | 47.84 | 7.39 | 15.01 | 7.89 |
| 6 | 4.65 | 7.50 | 3.04 | 6.28 | 7.50 | 7.39 | 9.38 | 5.92 |
| 7 | 0.93 | 6.57 | 0.00 | 6.28 | 6.57 | 6.47 | 3.75 | 5.92 |
| 10 | 76.21 | 6.57 | 0.00 | 9.42 | 6.57 | 7.39 | 0.00 | 8.88 |
| | | | | Polymer R | | | | |
| 1 | 87.73 | 97.47 | 100.10 | 91.10 | 96.72 | 96.30 | 99.81 | 97.44 |
| 2 | 94.33 | 100.00 | 93.71 | 87.96 | 93.15 | 94.55 | 101.59 | 100.10 |
| 3 | 89.41 | 91.84 | 98.28 | 22.62 | 87.90 | 90.48 | 96.44 | 93.10 |
| 4 | 86.06 | 89.87 | 81.95 | 1.05 | 25.23 | 91.13 | 90.43 | 95.27 |
| 5 | 13.29 | 86.40 | 8.11 | 0.00 | 2.25 | 50.18 | 80.68 | 91.72 |
| 6 | 0.0 | 65.20 | 0.10 | 0.00 | 0.38 | 9.24 | 37.15 | 71.70 |
| 7 | 0.0 | 6.29 | 0.00 | 0.21 | 0.00 | 1.29 | 2.72 | 13.61 |
| 10 | 72.49 | 17.07 | 0.51 | 0.94 | 0.00 | 5.27 | 0.00 | 49.01 |
| | | | | No polymer (blank) | | | | |
| 1 | 100.00 | 98.96 | 99.95 | 100.00 | 100.00 | 94.73 | 98.88 | 100.00 |
| 2 | 97.77 | 98.02 | 99.24 | 97.07 | 98.97 | 93.35 | 96.93 | 92.87 |
| 3 | 90.06 | 96.61 | 99.78 | 91.62 | 93.71 | 96.21 | 98.98 | 96.85 |
| 4 | 86.43 | 98.87 | 88.50 | 89.11 | 37.05 | 92.88 | 97.49 | 97.93 |
| 5 | 33.09 | 100.00 | 23.64 | 83.46 | 0.56 | 100.00 | 100.00 | 99.01 |

TABLE 22-continued

| | Metal concentration in the permeate. | | | | | | | |
|---|---|---|---|---|---|---|---|---|
| pH | Al | Cd | Cr | Cu | Fe | Ni | Pb | Zn |
| 6 | 0.93 | 99.53 | 0.22 | 52.04 | 0.00 | 98.15 | 51.58 | 94.98 |
| 7 | 0.00 | 95.38 | 0.00 | 22.09 | 0.00 | 96.77 | 7.26 | 70.64 |
| 10 | 73.05 | 82.00 | 0.00 | 85.55 | 0.00 | 93.81 | 1.77 | 64.04 |

EXAMPLE 23

A 0.1 wt/vol % solution of the polymeric hydroxamic acid from example I, was pared at each of the pH values 2, 6 and 8. Each solution was spiked with americium filtered in a 10,000 MWCO ultrafiltration membrane. Almost no retention of the ricium was observed at the lower pH values, but 99% retention was observed at the pH of 8. Thus, polymeric hydroxamic acid can bind an actinide such as americium under conditions of pH 8.

EXAMPLE 24

Binding studies of beta-bisphosphonates as diacid (polymer X), acid-ester (polymer Y) and diester (polymer V) were as follows. The same procedure as in Example 1 was followed to evaluate these polymers for americium binding. The polymers were prepared at 0.1 wt/vol % in sodium nitrate solution to an ionic strength of 0.1 and spiked with Am-241. The results are shown in Table 23 below. Polymer E, a different phosphonic acid containing polymer, is also shown in the Table for comparison. It can be seen that the americium binding order is the diacid>acid-ester>diester, and that the beta-bisphosphonic acid binds better at pH 2 than polymer E which is not a beta-bisphosphonic acid.

TABLE 23

| | Study of polymers V, W and X for binding of americium-241 | | | |
|---|---|---|---|---|
| pH | Polymer E Log $K_d$ | Polymer V Log $K_d$ | Polymer W Log $K_d$ | Polymer X Log $K_d$ |
| 2 | 3.94 | 1.64 | 2.73 | 4.22 |
| 4 | 4.81 | 3.3 | 3.63 | 4.22 |
| 6 | 4.91 | 3.87 | 4.14 | 4.41 |

EXAMPLE 25

To demonstrate the concept that two different molecular weight polymers having different functionality could be separated, two polymers were mixed in a ratio of 20:80 to give an overall 5 wt/vol % solution of polymer. Using polymer prepared as in example A, >100,000 MWCO and polymer Ca of between 10,000 and 30000 MWCO prepared as in example C, 100 mL were diafiltered through a 30,000 MWCO membrane at pH 6.0 collecting 3 volume equivalents which were evaporated to dryness and weighed. The recovery of solid polymer Ca was only 23% after 3 volume equivalents were collected. A blank of a 5 wt/vol % solution of polymer Ca gave 15% permeate (evaporated solid and weighed) after 3 volume equivalents. Though in the experiment only a small amount of material was collected, it indicated that size separation of two polymers was possible.

Although the present invention has been described with reference to specific details, it is not intended that such details should be regarded as limitations upon the scope of the invention, except as and to the extent that they are included in the accompanying claims.

What is claimed is:

1. A process of separating selected metal ions from an aqueous solution comprising:

contacting an aqueous solution containing selected metal ions with a reaction solution under conditions and for a period of time effective to form a water-soluble polymer-metal complex, the reaction solution including an effective amount of a water-soluble polymer having nitrogen-, oxygen-, or sulfur-containing groups capable of binding the selected metal ions, said water-soluble polymer having been pre-purified so as to have polymer molecule sizes capable of being retained by a membrane with a molecular weight cutoff value of a first preselected level and characterized as essentially free of polymer molecule sizes capable of passing through a membrane with a molecular weight cutoff value of a second preselected level, said second preselected level being smaller than said first preselected level; and, treating the aqueous solution by membrane separation means effective to separate water and low molecular weight materials having a molecular weight of less than said second preselected level from the aqueous solution while retaining a concentrated aqueous solution including materials having sizes capable of being retained by a membrane with a molecular weight cutoff value of greater than said second preselected level, said materials having sizes capable of being retained by a membrane with a molecular weight cutoff value of greater than said second preselected level including said water-soluble polymer and said water-soluble polymer-metal complex.

2. The process of claim 1 wherein the concentrated aqueous solution is treated under conditions effective to release the selected metal ions from the water soluble polymer-metal complex.

3. The process of claim 2 wherein the water soluble polymer is regenerated.

4. The process of claim 3 wherein the released selected metal ions are removed by a secondary membrane separation means effective to separate the released selected metal ions from said concentrated aqueous solution including said regenerated water-soluble polymer.

5. The process of claim 4 wherein said selected metal ions include nickel and zinc.

6. The process of claim 3 wherein said concentrated aqueous solution including said regenerated water-soluble polymer is recycled for use as reaction solution for contact with additional selected metal ion-containing aqueous solution.

7. The process of claim 2 wherein treating of said concentrated aqueous solution includes contacting the concentrated aqueous solution with a material selected from the group consisting of an acid, a reducing agent, and a compexant.

8. The process of claim 2 wherein said water-soluble polymer is a blend of a water-soluble polyethyleneimine having polymer molecule sizes capable of being retained by a membrane with a molecular weight cutoff value of greater than 30,000 and characterized as essentially free of polymer molecule sizes capable of passing through a membrane with a molecular weight cutoff value of less than 30,000, a carboxylate functionalized water-soluble polyethyleneimine having polymer molecule sizes capable of being retained by a membrane with a molecular weight cutoff value of greater than 30,000 and characterized as essentially free of polymer sizes capable of passing through a membrane with a molecular weight cutoff value of less than 30,000, and a phosphonate functionalized water-soluble polyethyleneimine having polymer molecule sizes capable of being retained by a membrane with a molecular weight cutoff value of greater than 30,000 and characterized as essentially free of polymer molecule sizes capable of passing through a membrane with a molecular weight cutoff value of less than 30,000.

9. The process of claim 1 wherein said aqueous solution further includes at least one competing material selected from the group consisting of cations, anions and organic materials.

10. The process of claim 1 wherein said first preselected level is 30,000 and said water-soluble polymer is characterized as having polymer molecule sizes capable of being retained by a membrane with a molecular weight cutoff value of greater than 30,000 and essentially free of polymer molecule sizes capable of passing through a membrane with a molecular weight cutoff value of less than 30,000.

11. The process of claim 10 wherein said second preselected level is 10,000.

12. The process of claim 1 wherein said first preselected level is 100,000 and said water-soluble polymer is characterized as having polymer molecule sizes capable of being retained by a membrane with a molecular weight cutoff value of greater than 100,000 and essentially free of polymer molecule sizes capable of passing through a membrane with a molecular weight cutoff value of less than 100,000.

13. The process of claim 12 wherein said second preselected level is 30,000.

14. The process of claim 1 wherein said water-soluble polymer is polyethyleneimine.

15. The process of claim 1 wherein said water-soluble polymer includes at least two water-soluble polymers each having a different functionalization capable of selectively binding different target selected metal ions.

16. The process of claim 1 wherein said water-soluble polymer includes at least two water-soluble polymers each having different functionalization capable of selectively binding different target selected metal ions and each having a different polymer size range such that the at least two water-soluble polymers can be treated by a membrane separation means sufficient to separate one water-soluble polymer from another water-soluble polymer.

17. The process of claim 1 wherein said water-soluble polymer is a blend of a water-soluble polyethyleneimine having polymer molecule sizes capable of being retained by a membrane with a molecular weight cutoff value of greater than 30,000 and characterized as essentially free of polymer molecule sizes capable of passing through a membrane with a molecular weight cutoff value of less than 30,000, a carboxylate functionalized water-soluble polyethyleneimine having polymer molecule sizes capable of being retained by a membrane with a molecular weight cutoff value of greater than 30,000 and characterized as essentially free of polymer molecule sizes capable of passing through a membrane with a molecular weight cutoff value of less than 30,000, and a phosphonate functionalized water-soluble polyethyleneimine having polymer molecule sizes capable of being retained by a membrane with a molecular weight cutoff value of greater than 30,000 and characterized as essentially free of polymer molecule sizes capable of passing through a membrane with a molecular weight cutoff value of less than 30,000.

18. The process of claim 1 wherein said selected metal ions include nickel and tungsten.

19. The process of claim 1 wherein said selected metal ions include silver.

20. The process of claim 1 wherein said selected metal ions include iron, aluminum, cadmium, copper, nickel and zinc.

21. The process of claim 1 wherein said selected metal ion is an oxyanion.

22. The process of claim 1 wherein said aqueous solution is textile processing waste water and said selected metal ions are selected from the group consisting of copper and chromium.

23. The process of claim 1 wherein said water-soluble polymer has polymer molecule sizes capable of being retained by a membrane with a molecular weight cutoff value of greater than 30,000 and characterized as essentially free of polymer molecule sizes capable of passing through a membrane with a molecular weight cutoff value of less than 30,000 and said water-soluble polymer includes functional groups each selected from the group consisting of carboxylic acid groups, phosphonic acid groups, acylpyrazolone groups, hydroxamic acid groups, aza crown ether groups, guanidium groups, thiolactum groups, amide groups, permethylated polyvinylpyridine groups, mercaptosuccinic acid groups, alkyl thiol groups, N-alkylthiourea groups, and catechol groups.

24. The process of claim 1 wherein said aqueous solution is electroplating rinse water.

25. The process of claim 1 wherein said aqueous solution is acid mine drainage.

26. The process of claim 1 wherein said aqueous solution is catalyst-containing waste water.

27. The process of claim 1 wherein said aqueous solution is nuclear reactor cooling water.

28. The process of claim 1 wherein said aqueous solution is cooling tower water.

29. The process of claim 1 wherein said aqueous solution is drinking water.

30. A process of selectively separating a target metal contained in an aqueous solution further including competing ions, wherein said target metal includes trivalent actinide metal ions and said competing ions include trivalent lanthanides, comprising:

contacting said aqueous solution with a reaction solution including an effective amount of a water-soluble polymer having nitrogen-, oxygen- or sulfur-containing groups capable of binding the target metal without binding said competing ions for a time effective to form a water-soluble polymer-trivalent actinide metal complex; and, separating said water-soluble polymer-trivalent actinide metal complex from said aqueous solution including said trivalent lanthanides.

31. A process of separating selected metal ions from an aqueous solution comprising:

contacting an aqueous solution containing selected actinide metal ions with a reaction solution under conditions and for time effective to form a water-soluble polymer-metal complex, the reaction solution including an effective amount of a water-soluble polymer having nitrogen-, oxygen-, or sulfur-containing groups capable of binding the selected metal ions, said water-soluble polymer having been pre-purified so as to have polymer molecule sizes capable of being retained by a membrane with a molecular weight cutoff value of a first preselected level and characterized as essentially free of polymer molecule sizes capable of passing through a membrane with a molecular weight cutoff value of a second preselected level, said second preselected level being smaller than said first preselected level; and, treating the aqueous solution by membrane separation means effective to separate water and low molecular weight materials having a molecular weight of less than said second preselected level from the aqueous solution while retaining a concentrated aqueous solution including materials having sizes retained by a membrane with a molecular weight cutoff value of greater than said second preselected level, said materials having sizes retained by a membrane with a molecular weight cutoff value of greater than said second preselected level including said water-soluble polymer and said water-soluble polymer-metal complex.

32. The process of claim 31 wherein said aqueous solution is urine including significant levels of competing ions, and said process substantially completely separates said actinide metal ions from said urine.

33. The process of claim 31 wherein said aqueous solution is a brine solution including significant levels of competing ions, and said process substantially completely separates said actinide metal ions from said brine solution.

* * * * *